(12) United States Patent
McHugh et al.

(10) Patent No.: US 8,650,156 B1
(45) Date of Patent: Feb. 11, 2014

(54) SYSTEM AND METHOD FOR FETCHING THE LATEST VERSIONS OF STORED DATA OBJECTS

(75) Inventors: Jason G. McHugh, Seattle, WA (US); Praveen K. Gattu, Redmond, WA (US); Michael A. Ten-Pow, Seattle, WA (US); Derek E. Denny-Brown, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 240 days.

(21) Appl. No.: 12/978,256

(22) Filed: Dec. 23, 2010

(51) Int. Cl.
*G06F 17/30* (2006.01)

(52) U.S. Cl.
USPC ............................... 707/638; 707/737

(58) Field of Classification Search
USPC ............... 707/737, 203, 728, 202; 726/5, 8
See application file for complete search history.

(56) References Cited

U.S. PATENT DOCUMENTS

| | | | |
|---|---|---|---|
| 6,874,001 B2 * | 3/2005 | Narang et al. ..................... | 1/1 |
| 7,099,896 B2 * | 8/2006 | Fields et al. ..................... | 1/1 |
| 8,131,723 B2 * | 3/2012 | Sim-Tang ..................... | 707/737 |
| 8,196,191 B2 * | 6/2012 | Norman et al. ..................... | 726/8 |
| 8,285,925 B1 * | 10/2012 | Sorenson et al. ............. | 711/113 |
| 8,302,169 B1 * | 10/2012 | Presotto et al. ................... | 726/5 |
| 2002/0073110 A1 | 6/2002 | Duvillier et al. | |
| 2002/0103814 A1 | 8/2002 | Duvillier et al. | |
| 2003/0061245 A1 | 3/2003 | Soria et al. | |
| 2003/0147536 A1 | 8/2003 | Andivahis et al. | |
| 2005/0262165 A1 | 11/2005 | Scott et al. | |
| 2006/0020578 A1 | 1/2006 | Hood | |
| 2007/0192544 A1 | 8/2007 | Frolund et al. | |
| 2010/0070698 A1 | 3/2010 | Ungureanu et al. | |
| 2010/0082553 A1 | 4/2010 | Beatty et al. | |
| 2010/0169288 A1 | 7/2010 | Brown | |
| 2010/0268820 A1 | 10/2010 | Shi et al. | |
| 2011/0107094 A1 | 5/2011 | Resch et al. | |

OTHER PUBLICATIONS

Ningning Zhu. "Data Versioning Systems". ECSL Technical reports (TR-131). Computer Science Department, Stony Brook University, Feb. 2003, 33 pages.
U.S. Appl. No. 12/886,757, filed Sep. 21, 2010.
U.S. Appl. No. 12/978,253, filed Dec. 23, 2010.

* cited by examiner

*Primary Examiner* — James Trujillo
*Assistant Examiner* — Thong Vu
(74) *Attorney, Agent, or Firm* — Robert C. Kowert; Meyertons, Hood, Kivlin, Kowert & Goetzel, P.C.

(57) ABSTRACT

A distributed storage system may store data object instances in persistent storage and may cache keymap information for those data object instances. The system may cache a latest symbolic key entry for some user keys of the data object instances. When a request is made for the latest version of stored data object instances having a specified user key, the latest version may be determined dependent on whether a latest symbolic key entry exists for the specified user key, and keymap information for the latest version may be returned. When storing keymap information, a flag may be set to indicate that a corresponding latest symbolic key entry should be updated. The system may delete a latest symbolic key entry for a particular user key from the cache in response to determining that no other requests involving the keymap information for data object instances having the particular user key are pending.

33 Claims, 24 Drawing Sheets keymap 510 → | A#2 | A#3 | A#4 | B#2 | B#3 | B#4 | C#2 | C#3 | C#4 |

*FIG. 5A* keymap 510 → | A#2 | A#3 | A#4 | B#1 | B#2 | B#3 | B#4 | C#2 | C#3 | C#4 |

*FIG. 5B* keymap 510 → | A#2 | A#3 | A#4 | B (implicit) | B#1 | B#2 | B#3 | B#4 | C#2 | C#3 | C#4 |

*FIG. 5C*

| keymap coordinator | range |
|---|---|
| KFC1 | 902 |
| KFC2 | 904 |
| KFC3 | 906 |
| KFC4 | 908 |
| KFC1 | 910 |
| KFC4 | 912 |
| KFC2 | 914 |
| KFC3 | 916 |

SYSTEM AND METHOD FOR FETCHING THE LATEST VERSIONS OF STORED DATA OBJECTS

BACKGROUND

Online and other remote data storage services have become widely available in recent years. In a typical model, a storage service may provide storage for backup data, which may be retrieved in the event of a hardware failure, an accidental deletion of data, or data loss as a result of a security breach or other malicious act. Storage services may also provide long-term remote storage for archival or historical purposes.

Although some storage systems support the storing of multiple versions of a file, they typically do not provide version-aware operations other than those used to support fairly simple backup and recovery services. In general, currently available storage services, and their underlying storage systems, do not support other use models that may require more access to, and/or control over, multiple versions of a file or other stored data. For example, a common use case for storage systems that support versioned data is to fetch the latest version of a piece of data (as opposed to fetching an explicitly specified version of the piece of data). Determining which of multiple stored versions of a piece of data can be expensive and time-consuming in a large distributed storage system, especially when different versions and/or metadata associated with different versions are stored in different storage blocks and/or on different computing nodes.

BRIEF DESCRIPTION OF THE DRAWINGS

FIGS. 5A-5C illustrate the ordering of elements in a key-map, according to some embodiments.

Figure 1:
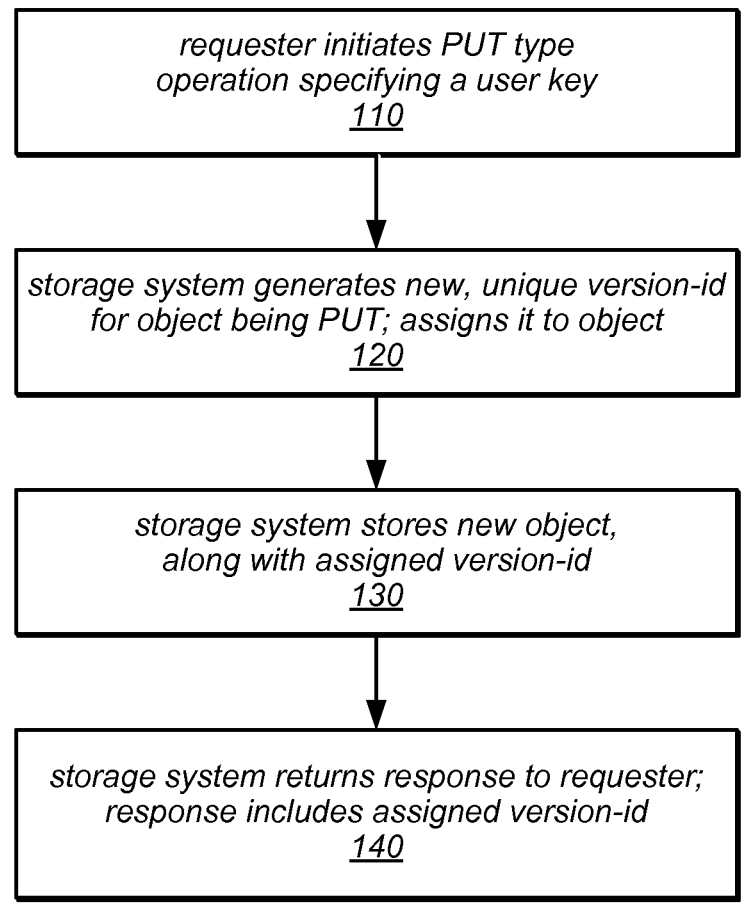
FIG. 1 is a flow diagram illustrating a method for storing a data object in a storage system that supports versioning, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

A distributed storage system may store multiple versions of a data object (i.e. multiple object instances having the same user key) in persistent storage, and may cache keymap information for those data object instances, e.g., in a keymap subsystem of the distributed storage system. Each data object instance may include a user key and a version identifier. The keymap information for each data object instance may be stored as a key-value pair and may map the user key of the data object instance to a locator and the locator to the instance of the data object. In some embodiments, the system may cache a latest symbolic key entry for at least some of the user keys of the stored data object instances, and this latest symbolic key entry may identify the version identifier (or version-id) of the latest version of the data object instances stored in the distributed storage system and having a particular user key. For example, the value mapped to the key for a particular data object version and stored with the key as a key-value pair in the cache may include an inode for the data object and/or other keymap information (once the keymap information has been successfully stored in a brick), and the value mapped to a latest symbolic key and stored with the latest symbolic key as a key-value pair in a latest symbolic key entry in the cache may be the version-id of the latest version of the objects having the user key specified by the latest symbolic key (if the latest version is known).

In some embodiments, if a request is made for the latest version of the stored data object instances having a specified user key (sometimes referred to herein as a GETNEAREST operation), the latest version may be determined dependent on whether a latest symbolic key entry exists for the specified user key. For example, if a latest symbolic key entry exists for the specified key, the keymap subsystem may return the version-id identified by the latest symbolic key entry for the specified user key. If a latest symbolic key entry does not exist for the specified key, the keymap subsystem may examine two or more keymap information entries that are cached or stored in persistent storage to attempt to determine the latest version of the stored data object instances having the specified user key. In some embodiments, when storing keymap information for a data object instance having a particular user key, a flag may be set to indicate that a corresponding latest symbolic key entry should be created or updated for the particular user key. In some embodiments, the distributed storage system may delete a latest symbolic key entry for a particular user key from the cache in response to determining that no other requests for the keymap information for data object instances having the particular user key are pending. This GETNEAREST technique is described in more detail below, according to various embodiments.

In some embodiments, the distributed storage system may cache keymap information for data object instances as key-value pairs in a distributed hash table on two or more computing nodes, where the key is a user key or a composite key that includes a sharable user key (e.g., a name for the object that may be common to multiple data object versions or instances) and one or more other locally or globally unique identifying elements. The keymap information stored in the distributed hash table for each data object instance may map the key to a locator and the locator to the instance of the data object. In some embodiments, a request to store keymap information for a data object instance may be routed to a particular one of the computing nodes on which the distributed hash table is implemented based on a consistent hashing scheme in which a hash function is applied only to a portion of the key of the data object instance. In this way, related keymap information (e.g., keymap information entries for which a portion of the key is common or similar) may be clustered on the same computing nodes. In some embodiments, related keymap information may be stored in the same storage partition or block (brick) on a single computing node and/or may be managed by a single keymap coordinator component of a keymap subsystem.

In some embodiments, a request to retrieve keymap information for a data object instance may be routed to a particular one of the computing nodes on which the distributed hash table is implemented based on a consistent hashing scheme in which a hash function is applied only to a portion of the key specified in the request. In some embodiments, by clustering related keymap information when it is stored in the distributed hash table, various operations in the distributed storage system may be performed more efficiently. For example, the retrieval of keymap information for related data objects (such as for multiple versions of the same object) may be more efficient when it is clustered on the same computing node (e.g., in the same cache) than if a hash function were applied to the entire unique (composite) key of each data object instance and the resulting distribution of the keymap information across the distributed hash table did not result in such clustering. The portion of the composite key to which the hash function is applied may include a user key portion of the composite key, a pre-determined number of bits of the composite key, or be identified using a delimiter in the composite key, in different embodiments. This key clustering technique is described in more detail below, according to various embodiments.

In various embodiments, the techniques described herein for finding the latest version of a stored data object and for clustering keymap information in a distributed hash table may be implemented independently of each other in different types of distributed storage systems, including those that support versioning. In other words, any given storage system may implement one of these techniques without the other, or may implement both of the techniques, in different embodiments. In embodiments in which the storage system implements both the key clustering techniques described herein and the techniques for finding the latest version of a stored data object, the GETNEAREST operation may be more efficient than in storage systems in which keymap information for related data object instances is not co-located in a single storage partition or block (brick) and/or on the same computing node. For example, the GETNEAREST operation may only need to examine the cache of a single keymap coordinator to access a latest symbolic key entry for a user key and/or cached keymap information entries for multiple data object instances for the user key in its attempt to determine the latest version of the data object instances for the user key. Alternatively, the GETNEAREST operation may only need to load a single storage block (brick) from persistent storage to access keymap information entries for multiple data object instances for the user key in its attempt to determine the latest version of the data object instances for the user key.

Storage Systems

In various embodiments, the methods described herein may be employed in local or remote storage systems, including systems that provide storage services to users (e.g., subscribers) over the Internet. As noted above, the storage systems described herein may provide support for storing multiple versions of an object and a variety of use cases that depend on such versioning support. In some embodiments, object versioning may be selectively enabled or suspended (e.g., by a data owner or privileged user) by toggling the versioning state of a collection of stored objects. The storage systems described herein may provide a simple interface that can be used to store and retrieve object data from a single stored version of an object or from any of a series of versions of the object. In various embodiments, multiple value versions of each object may be identified by a unique key, e.g., as a key-value pair in which the key is a composite key that includes at least a user key. The systems and methods described herein may allow users (e.g., storage service subscribers) and/or client applications (e.g., tools) to store, retrieve and/or delete objects without knowing (or needing to know) the versioning state of the targeted collection of stored objects or (in some cases) the version identifiers of the stored data objects.

In some embodiments, each stored object may include two identifying components: a user key and a version identifier (or "version-id"). In such embodiments, the combination of a user key and a version-id may uniquely identify an object in a bucket. Objects in the same bucket that have the same user key but different version-ids may be referred herein to as versions of one another, object versions of the key, object instances, or simply versions of the key.

The following concepts and terms may be used herein to describe storage systems and methods thereof, according to various embodiments:

Bucket—A bucket is a logical container in which objects may be stored in a storage system on behalf of a user. In some embodiments, every object may be contained in a bucket, and every object may be addressable using a combination of a bucket identifier and one or more identifiers of the object itself Object—Objects are the fundamental entities stored in a storage system. In some embodiments, the stored objects may include object data and/or metadata. For example, each object may include a data object portion, and a metadata portion (which may include default metadata and/or versioning related metadata). In some embodiments, an object instance may be uniquely identified within a bucket by the combination of a key (e.g., a user-supplied name for the object) and a version identifier (or version-id), which may be separate from the key or may be a component of composite key that includes the key.

Key—A key is an identifier for an object within a bucket. In some embodiments, every object in a bucket may have exactly one key, and the combination of a bucket, key, and version identifier may uniquely identify each object (e.g., each data object version or instance) stored in the storage system.

In some embodiments, the data object portion of an object may be opaque to the storage system, i.e. it may be treated as a "black box" entry by the storage system. In various embodiments, the default metadata of an object may include, e.g., a name-value pair, the date the object was last modified, and/or an indicator of the content type (i.e. the data type of the contents of the data object portion of the object). In some embodiments, the metadata associated with an object may include system interjected key-value pairs (containing, for example, a creation date and/or a last modified date), along with user supplied key-value pairs.

In various embodiments, the storage systems described herein may include support for the following storage related tasks: creating and naming buckets that store data and/or metadata in objects; storing data in buckets; storing keymap information for data stored in the buckets (where the keymap information maps specific object instances to locators associated with a given user key); retrieving data (e.g., read and/or downloading the contents of stored objects; retrieving keymap information for data stored in the buckets (which may, in turn, facilitate retrieval of the data stored in the buckets); deleting data stored in the bucket; and/or deleting keymap information from persistent storage and/or a cache.

As noted above, in some embodiments, all objects may be uniquely identified in the storage system by a user-key/version-id pair. In such embodiments, operations that retrieve data from objects, such as various GET type operations defined by an Application Programming Interface (API), may accept an optional version-id input that identifies a particular version of an object (i.e. a particular instance of an object) from which to retrieve data. For each of these APIs, if a user key is specified, but no version-id is specified, the system may be configured to automatically determine the version-id of the latest version of the object having the specified user key, and to retrieve data from that version of the object (i.e. to automatically fill in the latest version-id for a specified user key if no version-id is specified). In some embodiments, operations that create new objects, such as PUT type operations defined by the API, may automatically generate a unique version-id (which may be a unique string) and assign it to the newly created object instance. In some embodiments, a version-id may be bound to an object instance for the lifetime of the object and can never be changed. In some embodiments, subsequent to the execution of a DELETE type operation that specifies a user key, but not a version-id, attempts to retrieve an object instance having the specified user key without specifying a version-id may return an error indication. Note, however, that in some embodiments, the storage system may not have actually deleted any data objects, or the contents thereof. In some embodiments, in order to permanently delete an object version, a DELETE type request may need to specify both a user key and a version-id.

Unlike in previous storage systems (e.g., systems in which all objects are versioned or systems that do not support any object versioning), in some embodiments of the storage systems described herein, users may be able to turn object versioning on and/or off for a given bucket over time. In such embodiments, various operations performed on a bucket and/or on objects thereof may behave differently depending on whether versioning has been toggled on (i.e. is "enabled:") or is "off" (or "suspended") for the bucket. In other words, at least some of the actions taken to perform requested accesses may be dependent on whether object versioning is, or has ever been, enabled for the bucket. For example, when versioning is toggled on, PUT and DELETE type operations may not overwrite an existing object nor actually delete an object, and toggling versioning off may cause the storage system to stop automatically creating new versions in response to mutating operations such as these. In some embodiments, objects that are PUT into a bucket after versioning has been enabled cannot be overwritten and cannot overwrite the existing objects. In some embodiments, objects stored prior to versioning being enabled may be thought of as implicit object versions that have version-ids with a special sentinel value identifying them as implicit object versions.

As noted above, the most common access pattern for a storage system may be a request to access the latest version of an object (i.e. the latest version of an object having a specific user key). A naïve implementation of such an access in a system that supports the toggling of versioning state may require that a symbolic link be generated linking an access request to a user key that does not include a version-id (i.e. a non-versioned access) to a specific version of the object having the specified user key. In some embodiments, the systems and methods described herein may provide "latest version" support without the need to explicitly generate such symbolic links, and without relying on locking data objects and/or versions thereof. The systems described herein may provide latest version support by an extension of the underlying data structure in which data and metadata of various objects are stored and through the use of a GETNEAREST operation defined by the API such that a version-id may not need to be specified for all accesses to objects stored in the system.

In some embodiments, the version-ids described herein may include sequencers with the property that the most significant bytes of the version-id (i.e. a sequencer portion) encode the time at which the version-id was generated. In one example, the sequencer may encode a value representing the difference between a predetermined time in the distance future and the time at which the sequencer (or version-id) was created. In some embodiments, the system may store objects that include a series of version-ids (or sequencers thereof) that has a total ordering across all sequencers. In such embodiments, the result of a comparison of the version-ids of the stored objects may be the same as the result of a comparison of the times at which the version-ids (or sequencers thereof) were created. In some such embodiments, a GETNEAREST operation specifying a given user key, may return either the first key-value pair in the total ordering of key-value pairs that includes the given user key, or the next key-value pair in the total ordering of key-value pairs.

In some embodiments, a single Unicode data point (e.g., the null character or another pre-defined, reserved character) may be introduced into the version-id as a delimiter character to connect a user key with the sequencer. In such embodiments, sequences of key-value pairs (for which the key may be a composite key consisting of a user key, followed by a connector or delimiter character, followed by a version-id) may be stored within a data structure, e.g., in a keymap, to reflect an overall ordering of objects in a particular bucket. Note that in some embodiments, the chosen delimiter character may not be allowed in a user-specified key, or in any user-specified portion of the composite key described above. However, in some such embodiments, this character may be used by the storage system for internal operations. In some embodiments, the version-id for each explicit object version may include a sequencer portion and an ID portion (sometimes referred to herein as a locator), while the version-id for an implicit object version may be a special sentinel value. In some embodiments, the ID portion of a version-id for an explicit object version may be generated by the system (e.g., randomly, or using another suitable approach), and may be unique to the target bucket and/or the namespace for the specified user key. In other embodiments, the ID portion may be assigned by a data owner or privileged user, and may be required to be unique to the target bucket and/or the namespace for the specified user key. In some embodiments, the ID portion may be a globally unique identifier (GUID). For example, in some embodiments, the composite key for an explicit object version may be of the form shown below, and the combination of the sequencer and the ID portion may be referred to collectively as the version-id for the explicit object version.

[bucket/user key] [version delimiter] [sequencer] [ID]

In one example, the version delimiter for a composite key may be a null character (e.g., 0x00), and the version-id may comprise 16 bits (e.g., 8 bits for the sequencer portion and 8 bits for the ID portion). Other numbers and combinations of delimiters (or delimiter bits), sequencers (or sequencer bits), and identifiers (or identifier bits) may be included in a composite key, in other embodiments. The use of the composite key described above, along with a GETNEAREST operation, may in some embodiments provide a way for a storage system to automatically ascertain the version-id of (and access) the latest object version for a user key in constant time and without adding any additional indirection. Thus, in some embodiments the number of input/output operations required to put, get and/or delete keys in systems that support the toggling of versioning state and APIs that may or may not include a version-id may not be significantly different than the number of input/output operations used in standard accesses to keys in systems that do not support versioning or the toggling of versioning state.

Note that in some embodiments, the efficient logical deletion of an object may be supported in the underlying data structure of the storage systems described herein by the inclusion of object versions called "delete marker objects", or simply "delete markers". For example, in some situations, a user may wish to block or limit access to some or all versions of a user key without removing the key or its associated data from the storage system and/or bucket in which it is stored. In some embodiments, the systems described herein may create delete markers within the data structure to denote the logical deletion of the user key. In such embodiments, the objects having the specified user key may not actually be removed from the bucket in which they are stored, and may still be addressable and/or their contents may still be accessible (e.g., to the bucket owner and/or another privileged user). A delete marker is a special type of object version that may have no data associated with it. In some embodiments, a delete marker may be used to indicate that an object having the same user key as the delete marker has been logically deleted. A delete marker may be created by the storage system in response to a DELETE type operation that specifies only a user key and not a version-id. This newly created delete marker may be the latest version of the user key specified in the DELETE operation. Note that in some embodiments, multiple delete markers may be created for a given user key. Since a delete marker marks the logical deletion of an object or an object instance, it may be used to support end-user logical deletion as well as undelete operations, in some embodiments. In some embodiments, the use of delete markers may protect users from various accidental deletion scenarios.

As noted above, the systems described herein may include operations (e.g., as defined by an API) that support and understand object versioning, some of which may behave differently depending on the current (and/or past) versioning state of a targeted bucket. For example, in some embodiments, an operation for storing a data object in the system (e.g., a PUT type operation) may guarantee that the object will never be overwritten, and that only a privileged user with permission to delete specific object versions in the bucket in which it is stored (e.g., using a delete type operation that specifies its version-id) can delete it. This API may further guarantee that a store type operation will never overwrite an existing object in a bucket. FIG. 1 is a flow diagram illustrating a method for using such an API to store a new data object in a data storage system that supports versioning, according to one embodiment. As illustrated at 110, the method may include initiating a PUT type operation that specifies a user key. For example, a requester (e.g. a user, user application, or process) may issue a PUT OBJECT instruction to a shared storage system or storage service, and that PUT OBJECT instruction may conform to an API similar to those described herein. The PUT OBJECT instruction may be issued to request that a particular data object be stored in a bucket that is owned by the requester (e.g., a bucket owned by a user who is a storage service subscriber), and/or that is currently being accessed. Note that in some embodiments, if the requester does not have permission to modify the contents of the bucket, the storage system may return an error indication in response to an attempt to perform this operation (not shown).

In response to receiving the request (i.e. via the PUT instruction), the storage system may assign a version identifier (version-id) to the new data object. In this example, it is assumed that versioning is enabled for the bucket into which the new data object is to be stored. Therefore, the method may include the storage system generating a new, unique version-id for the new data object, and assigning that version-id to the new data object, as in 120. The storage system may then store the new data object in the target bucket, along with its assigned version-id, as in 130. Note that in some embodiments, if versioning is not enabled for the bucket, the method may include the storage system assigning a special sentinel version-id value to the new data object representing an implicit version-id for the non-versioned data object. In that case, if the bucket already stores an existing data object having the same user key as the new data object and that existing data object has the sentinel version-id value, storing the new data object may include overwriting the existing data object that has the same user key and the sentinel version-id value. As illustrated at 140 in FIG. 1, the storage system may return a response to the requester indicating whether the PUT operation was successful (i.e. whether the data object was successfully stored in the target bucket). As illustrated in this example, the version-id assigned to the data object in response to the PUT operation may be included in the response returned to requester. For example, in some embodiments, the assigned version-id may be included in a header element in the response.

In some embodiments, when an object is stored in a bucket, metadata about the object may be stored in a data structure (e.g., a keymap) associated with the bucket. This metadata may indicate the user key, version-id value, and a creation/modification date. For example, in some such embodiments, when a new object is created, a timestamp corresponding to the date and time at which the new object is created may be stored as a creation/modification date for that object in a keymap element associated with the object. If the object is an implicit object version (e.g., one with the special sentinel version-id value indicating that it is an implicit object version), the creation/modification date in the keymap element associated with the object may be updated when (and if) the implicit object version is overwritten by a subsequent store operation.

Figure 2:
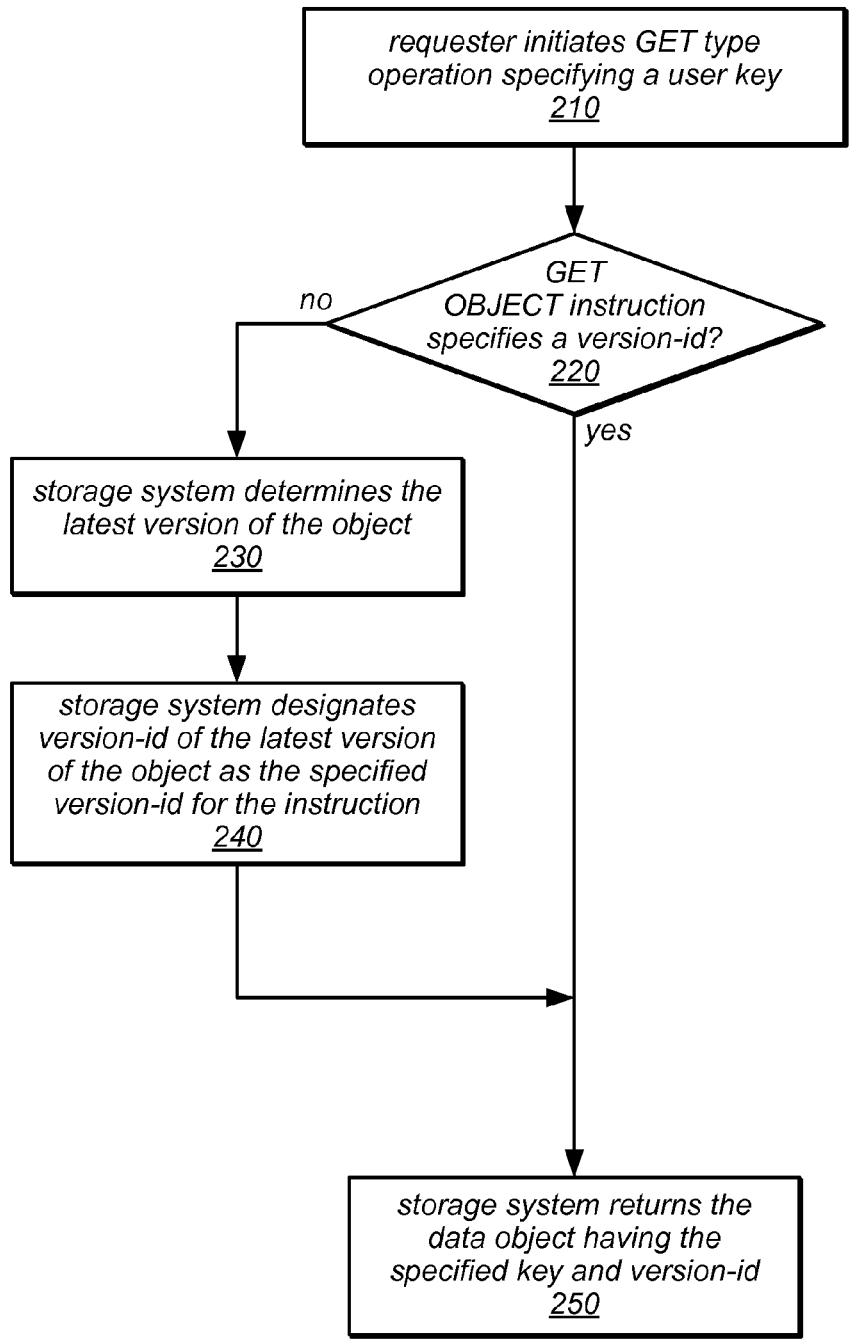
FIG. 2 is a flow diagram illustrating a method for retrieving a data object from a storage system that supports versioning, according to one embodiment.

In various embodiments, data objects stored in the system may be retrieved using a GET type operation, e.g., a GET OBJECT operation. In some embodiments, the requester may need to have permission to access the object version being retrieved in order to perform this operation. FIG. 2 is a flow diagram illustrating a method for retrieving a stored data object from a data storage system that supports versioning, according to one embodiment. As illustrated at 210, the method may include a requester (e.g. a user, user application, or process) initiating a retrieve type operation that specifies a user key. For example, the requester may issue a GET OBJECT instruction to a shared storage system or storage service, and that GET OBJECT instruction may conform to an API similar to those described herein. The GET OBJECT instruction may be issued to request that a data object be retrieved from a bucket that is owned by the requester (e.g., a bucket owned by a user who is a storage service subscriber), and/or that is currently being accessed. In response to receiving the request (i.e. via the GET OBJECT instruction), the storage system may return the data object specified in the request, as described in more detail below.

As illustrated in this example, if the GET OBJECT instruction does not specify a version-id, shown as the negative exit from 220, the method may include the storage system determining the latest version of the data object having the specified user key (e.g., using a GETNEAREST operation), as in 230, and designating its version-id as the specified version-id for the GET OBJECT instruction, as in 240. Note that in some cases the data object version that is determined to be the latest version by the operation illustrated at 230 may not be latest version of the object by the time one or more of the subsequent operations illustrated in FIG. 2 are performed. However, the data object version that was determined to be the latest version at 230 may be the target of the GET OBJECT operation for the remainder of the GET OBJECT process illustrated in FIG. 2. As illustrated in FIG. 2, the method may include the storage system returning the stored data object that has the specified user key and the specified version-id, as in 250. For example, if a version-id was not specified in the GET OBJECT instruction, the storage system may return the stored data object that has the specified user key and the version-id that was determined to be the version-id of the latest version of the data object. If the GET OBJECT instruction does specify a version-id, shown as the positive exit from 220, the storage system may return the stored data object that has the specified user key and the version-id that was specified in the GET OBJECT instruction.

Note that in some embodiments, a method for retrieving a stored data object from a data storage system that supports versioning may include determining whether the specified version is a delete marker (not shown). If so, the storage system may return an error indication to the requester. In some embodiments, the method may include the storage system determining whether the requester has permission to access (i.e. to view and/or retrieve) the specified version (not shown). If not, the storage system may return an error indication to the requester.

The systems described herein may in some embodiments support multiple operations for listing the contents of a bucket. For example, one operation defined by the API may behave in a manner similar to that of a corresponding operation in existing storage systems that do not support data object versioning. Such an API may be used to list only the versions of stored data objects that can be retrieved without specifying a version-id for the data objects (e.g., the latest version of versioned objects and any implicit versions of non-versioned objects). Another operation defined by the API may be used to list all of the versions of the data objects stored in a given bucket, rather than only the versions of stored data objects that can be retrieved without specifying a version-id for the data objects. In some embodiments, these listing operations may benefit from the key clustering techniques described herein (e.g., by employing them in an operation to find the latest version of an object when other techniques are not implemented).

As noted above, in some embodiments, a data structure (e.g., a keymap) may store metadata about the objects contained in a storage system or in a bucket thereof. For example, in some embodiments, a keymap for a particular bucket may include a collection of inodes, each of which represents an object (i.e. a version or instance of an object) stored in the bucket. Each inode may include metadata associated with the object it represents, and this metadata may indicate (e.g., directly or through any of various encoding schemes) its user key, version-id, and creation or modification date. The order of the inodes in a keymap may reflect a total ordering for the objects in a bucket, e.g., based on the user keys and version-ids of the objects in the bucket. For example, in some embodiments, the inodes may be sorted first by user key (e.g., lexicographically), and then by version-id. In some such embodiments, the object versions returned by a listing type operation may be ordered first in ascending lexicographic order of their keys (e.g., in alphabetical order, A to Z), and then in descending order of their creation dates (i.e. with the latest version listed first). The use of keymaps in determining the latest version of an object is described in more detail below.

Figure 3A:
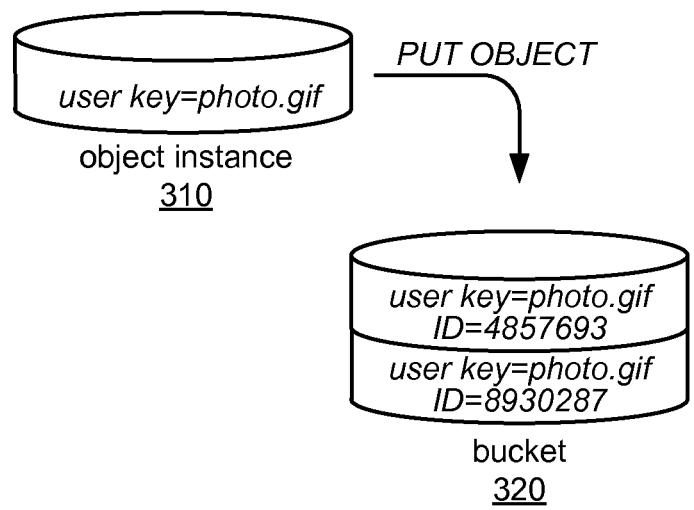
FIGS. 3A-3F illustrate the effects of various operations on a versioning-enabled bucket in a storage system that supports versioning, according to one embodiment.
Figure 3B:
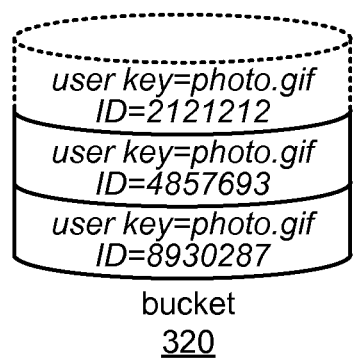
Figures 3C, 3D:
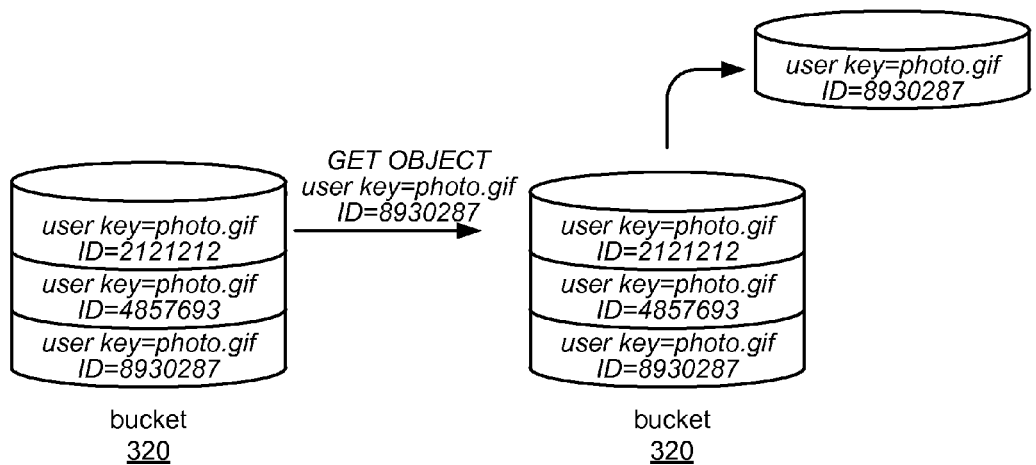

Several examples of keymaps are illustrated in FIGS. 3A-3C, and described in more detail below. FIGS. 3A-3F illustrate the effects of various operations on a bucket in a storage system that supports versioning, according to one embodiment. As previously noted, in some embodiments, when an object is stored in a versioning-enabled bucket, the old version may not be overwritten. This is illustrated in FIGS. 3A and 3B. For example, FIG. 3A illustrates a PUT OBJECT operation in which a new version of an object having the user key "photo.gif" is stored in a versioning-enabled bucket 320 that already contains two objects with the same name (i.e. with the same user key). In this example, the original object (i.e. the object having the version-id value shown as ID=8930287) and another version of the object (i.e. the object having the version-id value shown as ID=4857693) remain in bucket 320 following the PUT OBJECT operation. In response to the PUT OBJECT operation (which does not specify a version-id), the system generates a new version identifier (shown as ID=2121212), and adds the newer version of the object "photo.gif" (illustrated in FIG. 3A as object instance 310) to bucket 320. The result of this PUT OBJECT operation is illustrated in FIG. 3B, which depicts bucket 320 storing all three of these versions of the object "photo.gif". Note that the functionality described herein for generating new version identifiers for objects when they are stored in the system may prevent users from accidentally overwriting or deleting objects, and may also provide users the opportunity to retrieve a previous version of an object.

In some embodiments, any given version of an object (except, e.g., a delete marker object) may be retrieved using a GET OBJECT operation that specifies the version-id of the given version. This is illustrated in FIGS. 3C and 3D. In this example, FIG. 3C illustrates a GET OBJECT operation targeting versioning-enabled bucket 320 that specifies user key "photo.gif" and version-id 8930287. In this example, even though the specified version of the object is not the latest version of the object, it may be retrieved and returned by the storage system. The result of this GET OBJECT operation is illustrated in FIG. 3D, which depicts that the data object having user key "photo.gif" and version-id 8930287 is returned to the requester. Note that in some embodiments, the storage system may return a specified object version even if it is not the latest version of that object, and even if the latest version of that object (or any more recent version of that object) is a delete marker object. Note that, in this example, there is no change in the contents of bucket 320 as a result of this GET OBJECT operation.

Figures 3E, 3F:
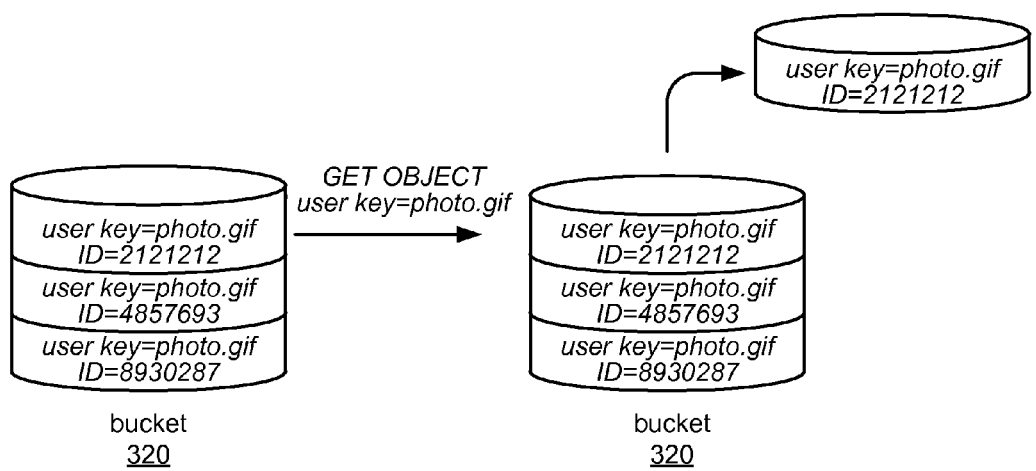

In some embodiments, by default, a GET OBJECT operation may retrieve and return the latest version (i.e. the most recently stored version) of an object having a specified user key, e.g., if no version-id is specified for the operation. This is illustrated in FIGS. 3E and 3F. In this example, a GET OBJECT operation targets versioning-enabled bucket 320 and specifies a user key "photo.gif" (but not a version-id). In response, the storage system determines the version-id corresponding to the latest version of the data object having the specified user key, as described in more detail herein. In this example, the storage system returns the data object having user key "photo.gif" and version-id 2121212 to the requester, since this is the latest version of an object having the user key "photo.gif". In this example, there is no change in the contents of bucket 320 as a result of this GET OBJECT operation. Note that in some embodiments, in response to a GET OBJECT operation specifying a user key but not a version-id, the storage system may return an error indication if the latest version of the object is a delete marker.

As previously note, in some embodiments, the storage system may cache keymap information for each user key and/or for each object instance (version) stored in the system. In some such embodiments, the cached keymap information for each key may include information corresponding to the value of the keymap information and/or timing information identifying the last action associated with the keymap information. In some embodiments, a cache component of a keymap coordinator may maintain cached keymap information for each brick manger that maintains the respective keymap information. For example, a keymap coordinator may utilize three brick manager components to maintain the keymap information, and the cache component of the keymap coordinator may maintain cached keymap information for each of the three brick manager components. Note that in some embodiments, a keymap coordinator may update the entire cache component (e.g., the entire cache corresponding to all associated brick managers) in the event that it is determined that another component has updated a relevant portion of the keymap information for at least one user key. In other embodiments, the keymap coordinator may have the ability to update only a portion of the cache based on a determination of updated keymap information. In still other embodiments, the keymap coordinator may be able update only the portion of the cache that corresponds to an individual brick manager.

As previously noted, a common use case for storage systems that support versioned data is to fetch the latest version of a piece of data, and this operation is distinct from an API or request to fetch an explicitly specified version of the piece of data. Determining which of multiple stored versions of a piece of data can be expensive and time-consuming in a large distributed storage system, especially when different versions and/or metadata associated with different versions are stored in different storage blocks and/or on different computing nodes. For example, an effective cache hit rate for the storage system may be negatively impacted if a GETNEAREST API cannot leverage the cache appropriately.

In some embodiments, the systems described herein rely upon a consistent hash table to efficiently fetch inode information about a user key. As noted above, in systems in which versioning is enabled, all of the versioned data objects (i.e. versioned keys) may be stored using unique keys that have the form [bucket/user key] [version delimiter] [sequencer] [GUID], where the combination of the sequencer and the GUIID may be considered the version-id for the object version (instance). In some such storage systems, with only this information stored in the cache, in order to determine the latest version of a user key based the system may always need to evaluate this information from the persistent system (using the brick manager), rather than from the cache, since cache entries can be evicted.

In order to efficiently support this use case, the storage systems described herein may include support for the concept of a "latest symbolic key". A cache entry for this latest symbolic key may hold the information about which version of a user key is the latest version of that user key. In some embodiments, a latest symbolic key record may be represented in a cache in a keymap subsystem (e.g., in a keymap coordinator) with the composite key [k][V], where k is the user key and V is a special version identifier that cannot be used as a version-id within normal cache entries. In one embodiment, the special version-id value may be chosen as the Long. MAX_VALUE, which is a value used to generate other version-id values (e.g., by subtracting the current time from Long.MAX_VALUE). Using the notation above, a latest symbolic key may be of the form [k][Long.MAX_VALUE]. In some embodiments, this latest symbolic key may be mapped to a value identifying the latest version of the objects having the user key k (if the latest version is known), or may be mapped to a special sentinel value (if the latest version is unknown), and may stored in a latest symbolic key entry the cache in a keymap subsystem along with the value to which it is mapped (e.g., as a key-value pair).

Note that keeping a latest symbolic key entry up-to-date may be non-trivial. For example, there are multiple operations in the storage system that can affect which version of an object becomes the latest version of that object, some of which are described below.

In some embodiments, when a Web server or Web service interface (WS) performs a PUT operation to the keymap coordinator (KFC) for a versioned object having the user key k. For example, the Web server may perform a PUT operation for an implicit data object instance identified by a composite key [k][null], or for an explicitly specified data object instance identified by the composite key [k][123]. In some embodiments, the Web server may send a special flag "update-nearest=true" to the KFC indicating to the KFC that that the value mapped to the latest symbolic key may need to be updated. In some embodiments, the Web server may only sends this flag if the user key belongs to a versioning enabled bucket. Note that the inclusion of the flag "update-nearest=true" does not indicate that [k][null] or [k][123] is the latest version, as the Web server has no way of knowing this information. Instead, this flag merely indicates that this key composite might represent the latest key, and that KFC should update the latest symbolic key entry if the newly PUT key is determined to be the latest version of the key.

In some embodiments, in response to receiving the request, the KFC may update the record represented by [k][Long.MAX_VALUE] with a sentinel, and may perform the PUT to a brick manager (BM). The KFC may also send a flag "calculate-is-nearest=true" to the brick manager.

When BM receives the PUT request with the calculate-is-nearest flag, it may attempt to calculate whether the version that is being inserted is the latest version of the user key. Note that versions of a user key may span across multiple storage partitions or blocks (bricks). Therefore, in some cases, in order for the brick manager to make this calculation, multiple blocks may need to be loaded, which can dramatically impact PUT performance. In order to avoid this negative performance impact, in some embodiments, the brick manager may only make a best effort calculation. In such embodiments, the brick manager may attempt to calculate the latest version only in the context of the block that is currently loaded (e.g., the block in which the PUT is being performed). As a result, it may sometimes be the case that the brick is not be able to make this calculation, e.g., if the key that is being inserted falls on a block edge. Therefore, there may be three possible outcomes for this calculation, indications of which may be returned with the response header is-nearest (NEAREST, which indicates that the key that is inserted is the latest version; NOTNEAREST, which indicates that the key that is inserted is not the latest version; and UNKNOWN, which indicates that the brick manager was unable to determined whether the key that is inserted is the latest version).

In some embodiments, on receiving the PUT response, the KFC may examine the value of the is-nearest header, and if the value is set to "NEAREST", it may update the record represented by the composite key [k][Long.MAX_VALUE] with the value [k][null] or [k][123], in this example. In other cases, the sentinel that was inserted for [k][Long.MAX_VALUE] at the start of the PUT operation may be removed if there are no in-flight requests that could potentially affect [k][Long.MAX_VALUE] (i.e. any data or keymap information access operations for which the specified user key is k).

In some embodiments, in response to a GETNEAREST call to the KFC for a user key k, the KFC may look for a value of a [k][Long.MAX_VALUE] entry in its cache. In such embodiments, if this value does not exist in the cache, a GETNEAREST call for user key k may be made to the brick manager. The brick manager may then return the most recent version of user key k, e.g., [k][123] in response. In this case, the KFC may update two cache entries. One is a record for the composite key [k][123]. The other is a record with a composite key [k][Long.MAX_VALUE], that stores the value [k][123], indicating that the version identified by the composite key [k][123] is the latest version of user key k.

Figure 4:
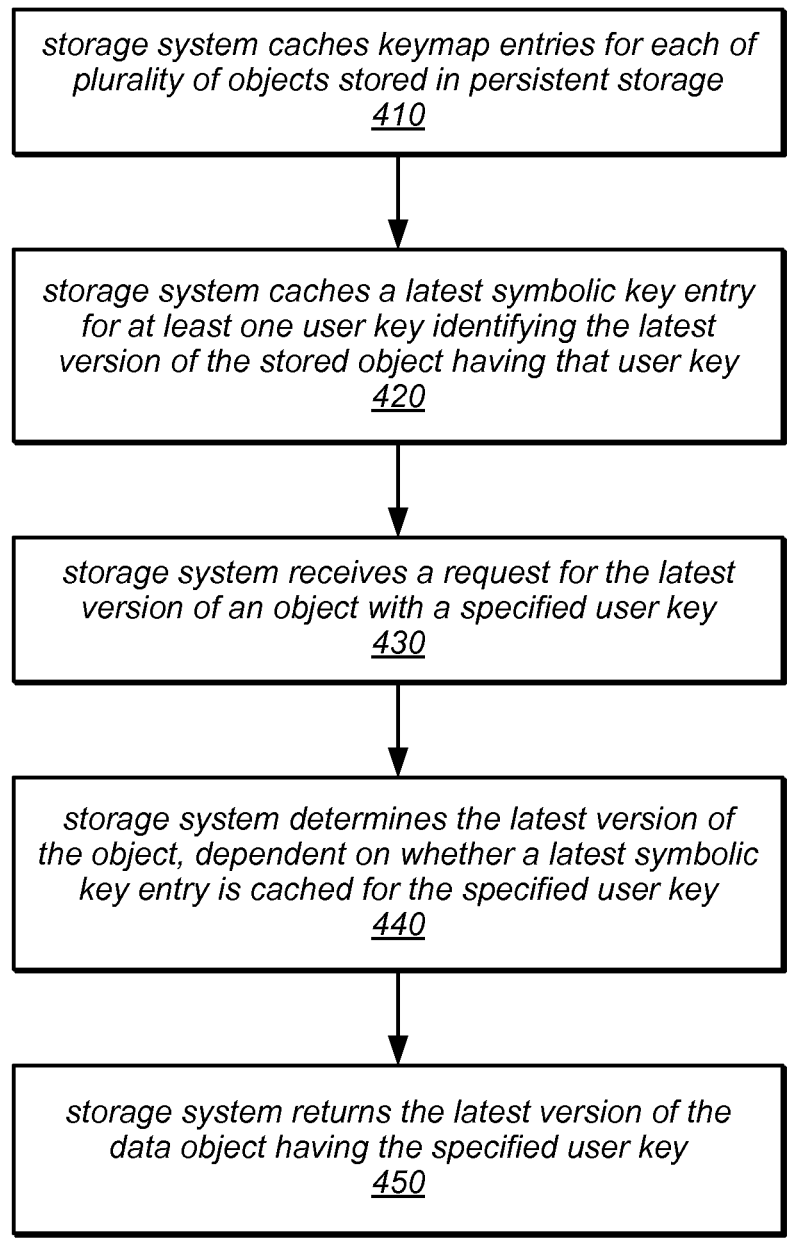
FIG. 4 is a flow diagram illustrating a method for efficiently fetching the latest version of a stored data object, according to one embodiment.

A method for efficiently fetching the latest version of a stored data object is illustrated in FIG. 4, according to one embodiment. As illustrated at 410, in this example, the method may include the storage system caching keymap entries for each of plurality of objects stored in persistent storage. In various embodiments, the storage system may include multiple caches (each of which caches a subset of the keymap entries for the storage system) or a distributed hash table, across which keymap entries are distributed. As illustrated in this example, the storage system may also cache a latest symbolic key entry for at least one of the keys (e.g., one of the user keys) of the objects stored in persistent storage, as in 420. As described herein, this latest symbolic key entry may identify the version of the stored object having that user key that was determined (at some prior point) to be the latest version of all the objects stored in the storage system having that user key.

As illustrated at 430, in this example, the method may include the storage system receiving a request for the latest version of an object, i.e. the latest version of all the stored objects having a particular user key that is specified in the request. In response to this request, the storage system may determine the latest version of the object, as in 440. As illustrated in this example, determining the latest version of the object may be dependent on whether a latest symbolic key entry is cached for the specified user key. Methods for determining the latest version of an object using such a latest symbolic key entry are described in more detail below. Once the latest version of the object has been determined, the method may include the storage system returning the latest version of the data object having the specified user key, as in 450. For example, once the keymap information for the latest version of the object has been determined, this information may be used to locate and access the requested data object from the location at which it is stored in the storage system.

In various embodiments, individual objects may be identified within the distributed storage network using various distinct items of information, e.g., a user key, a composite key, a version-id, and/or a locator. Generally speaking, keys, version-ids, and locators may each include alphanumeric strings or other types of symbols that may be interpreted within the context of the namespace of the distributed storage network as a whole, although keys, version-ids, and locators may be interpreted in different ways. In some embodiments, a key (i.e. a user key) may be specified by a client, or on behalf of a client, at the time a corresponding object is created within a particular bucket (e.g., in response to a request by the client to store a new object). If no user key is specified by the client, a user key and/or a composite key may be assigned to the new object by the distributed storage network. In such an embodiment, each respective composite key associated with an object of a particular bucket may be required to be unique within the namespace of that bucket.

In some embodiments, a locator may represent a globally unique identifier (GUID) of an object among all objects known to the distributed storage network. That is, while a composite key may be unique to a namespace associated with a particular bucket, a locator may be unique within a global namespace of all objects within all buckets. For example, a locator may include an alphanumeric string generated by the distributed storage network to be unique among other locators. In some embodiments, multiple instances of an object may be replicated throughout the physical storage devices used to implement the distributed storage network, for example to increase data redundancy and fault tolerance. In such embodiments, a unique locator may exist for each replicated instance of a given object. In some embodiments, keymap information may correspond to a mapping of key to one or more corresponding locators. The keymap information may be maintained by a keymap subsystem and utilized by a distributed storage network to access objects maintained by the distributed storage network. In some embodiments, the keymap information may be updated, or otherwise modified, as instances of specific objects are created, deleted, or otherwise manipulated within the distributed storage network.

FIGS. 5A-5C illustrate examples of the ordering of the elements (e.g., inodes) in a keymap, according to one embodiment. In these examples, keymap 510 reflects the contents of a bucket that includes objects having user keys of A, B, and C. FIG. 5A illustrates the contents of keymap 510 after three explicit versions of each of these objects have been stored in the bucket (i.e. while versioning was enabled for the bucket). In this example, the version-id values for these objects (each of which may comprise a sequencer value and a unique identifier, in some embodiments) have been simplified for illustration purposes, and are shown as version-id values of 2, 3, and 4.

As described herein, in some embodiments, the elements in a keymap for a given bucket may be sorted first by user key (lexicographically), and then by their version-id values. In embodiments in which the version-id values for each explicitly created object version includes a sequencer portion based on the creation date of the object, sorting keymap elements for explicit object versions by their version-id values effectively places them in order of the creation dates of those objects (i.e. in reverse chronological order, such that the elements associated with the most recently stored object versions appear first in the keymap). This sorting scheme is illustrated in FIG. 5A, in which the three versions of an object having user key A are sorted in reverse order by version-id, and are followed by the three versions of an object having user key B (again sorted in reverse order by version-id), and finally the three versions of an object having user key C (sorted in reverse order by version-id).

As described herein, a GETNEAREST operation may in some embodiments be invoked by the storage system to determine the latest version of an object with a given user key, when no version-id is specified for an operation specifying the given user key. In some embodiments, this GETNEAREST operation may search the keymap for the target bucket to locate the first keymap element (e.g., inode) having the specified user key. If all of the elements in the keymap having the specified user key are associated with explicit object versions, and are sorted as described above, the first element in the keymap having the specified user key may represent the latest object version with the specified user key. Thus, in the example illustrated in FIG. 5A, a GET type operation on user key A would return the data of the object represented by the first element of the keymap (A#2), which is an object having user key A and a version-id value of 2, since this is the latest object version with user key A. Similarly, a GET type operation on user key B would return the data of the object represented by the fourth element of the keymap (B#2), since this is the latest object version with user key B, and a GET type operation on user key C would return the data of the object represented by the seventh element of the keymap (C#2), since this is the latest object version with user key C. Note that in other embodiments, the elements in the keymap may be sorted using other schemes, and a GETNEAREST operation may examine two or more keymap entries in order to determine which corresponds to the latest object version for a given user key.

FIG. 5B illustrates the contents of keymap 510 after an additional object version having user key B is stored in the bucket associated with keymap 510. Again, it is assumed, in this example, that versioning is enabled for this bucket at the time the additional object version is stored, and that the keymap entries are sorted as described above. Therefore, the newly stored object is an explicit object version with user key B and a newly generated version-id value. As illustrated in this example, a new element is added to the keymap between the last element representing objects having the user key A (i.e. the element representing the oldest stored object version with user key A) and the first element representing a previously stored version of the object having user key B (i.e. the element representing the most recently stored version of the object prior to storing this new object version). In this example, the new element, shown in the fourth position in keymap 510, reflects a user key of B, and a simplified version-id value of 1, although the version-id value may in some embodiments comprise a sequencer value and a unique identifier. In the example illustrated in FIG. 5B, a GET type operation specifying user key B, but not specifying a version-id, may return the data of the explicit object version associated with this new element in keymap 510 (labeled as B#1), because a GETNEAREST operation specifying user key B may correctly identify this element of keymap 510 as the one representing the latest object version with user key B. Note that the results of a GET type operation that specifies user key A or user key C would be no different than in the example illustrated in FIG. 5A.

In the examples illustrated in FIGS. 5A and 5B, it is assumed that versioning is enabled for the bucket associated with keymap 510, and that no objects having user keys A, B, or C were stored in the bucket prior to versioning being enabled or while versioning was suspended for the bucket. Therefore, no object versions stored in the bucket having these user keys have a version-id value that is a special sentinel value for implicit object versions (i.e. a value reflecting that the object was stored while versioning was off or suspended for the bucket). In the example illustrated in FIG. 5C, keymap 510 includes an element representing one or more objects that were stored in the bucket prior to versioning being enabled or while versioning was suspended. This element, shown as the fourth element in keymap 510, represents an implicit object version having a user key B and a version-id value that indicates that it is an implicit object version. In this example, the implicit object version represented by this element in the keymap may have been stored (and/or its data overwritten, as described herein) at any arbitrary time during which versioning was off or enabled. However, in various embodiments, the keymap element associated with this implicit object version may appear first in the ordering of elements associated with objects having user key B. For example, in some embodiments, the special sentinel value assigned as the version-id for implicit object versions in the storage system may be a value that is always numerically lower than any other valid version-id in the storage system. In such embodiments, an element representing an implicit version of an object with a given user key may always be the first element in the keymap for objects with the given user key. In some embodiments, the version-id portion of keymap elements representing implicit object versions may be empty (i.e. it may not contain any value).

In the example illustrated in FIG. 5C, in response to receiving a GET type operation specifying user key B, but not specifying a version-id, the storage system may invoke a GETNEAREST operation to determine the latest object version with user key B. However, because the keymap includes an element representing an implicit object version with user key B, in this example, it may not be sufficient for the GETNEAREST operation to merely identify the first element in the keymap with user key B. For example, while an element representing an implicit object version for a given user key may always appear first in the keymap (because the elements were sorted by their version-ids), this implicit object version may not contain the most recently stored data for the given user key. Instead, the second element with the given user key (i.e. an element representing the most recently stored explicit object version with the given user key) may represent the object version that contains the most recently stored data for the given user key. Therefore, in some embodiments, the GETNEAREST operation may need to examine the creation/modification dates of the element associated with the implicit object version and an adjacent element associated with an explicit object version in order to determine which is the latest object version for the given user key. In the example illustrated in FIG. 5, a GET type specifying user key B may compare the creation/modification dates of the implicit object represented by the fourth element of keymap 510, shown as "B (implicit)" in FIG. 5C, and the explicit object represented by the fifth element of keymap 510 (labeled as B#1), and may return the data of the object with the most recent creation/modification date, as follows:

GETNEAREST (B)=>Latest (B,B#1)

In some embodiments, the storage systems described herein may provide the operations described above using standards-based Representational State Transfer (REST) and/or Simple Object Access Protocol (SOAP) interfaces designed to work with a variety of applications, development tools, and/or Internet-development toolkits. These interfaces are similar, but there are some differences. For example, in the REST interface, metadata is returned in HTTP headers. If the storage system only supports HTTP requests of up to a given size (e.g., 4 KB, not including the body), the amount of metadata that may be associated with a stored object may be restricted. Using REST, standard HTTP requests may be issued to create, fetch, and delete buckets and/or objects thereof. In various embodiments, a user may employ a toolkit that supports HTTP in order to use the REST API, or may use a browser to fetch objects, as long as they are anonymously readable. A REST API may use standard HTTP headers and status codes, so that standard browsers and toolkits work as expected. In some embodiments, functionality may be added to HTTP (for example, headers may be added to support access control). In such embodiments, the functionality may be added such that it matches the style of standard HTTP usage. In some embodiments, a SOAP API may provide a SOAP interface (e.g., a SOAP 1.1 interface) using document literal encoding. As with the REST interface, users may employ a SOAP toolkit to create bindings, and then may write code that uses these bindings to communicate with the storage system.

In one embodiment, an API that provides access operations in an online or remote storage system that supports object versioning may include a PUT type operation that specifies any or all of the following information for the request, some of which may be input by a user, and some of which may be generated and/or attached to the request by a client or host process: a user key, a bucket identifier, and/or a date and/or timestamp reflecting the date/time of the request. In response, the storage system may return any or all of the following: a status indicator reflecting the success or failure of the operation, the version-id assigned by the storage system to the data object, a date and/or timestamp reflecting the date/time at which the data object was stored (e.g., the date/time at which the operation was completed), and/or an identifier of a server on which the data object was stored.

In this example, the API may include a GET type operation that specifies any or all of the following information for the request, some of which may be input by a user, and some of which may be generated and/or attached to the request by a client or host process: a user key, a version-id, a bucket identifier, and/or a date or timestamp reflecting the date/time of the request. In response, the storage system may return any or all of the following, in addition to the requested object data: a status indicator reflecting the success or failure of the operation, the version-id of the data object returned in response to the request, a date and/or timestamp reflecting the date/time at which the data object was stored or a date and/or timestamp reflecting the last time the returned data object was modified, and/or an identifier of a server from which the data object was retrieved. In other embodiments, information other that than described above may be included in a GET type request or response or a PUT type request or response (e.g., a user/subscriber identifier, an authorization code, a content type, a content size of the data object (e.g., the number of bytes of content stored in the data object), an internal identifier of the object, or an identifier of the request).

In various embodiments, a storage system the employs the techniques described herein may store multiple versions of data objects in persistent storage, may store keymap information for those data objects in persistent storage, may cache keymap information and/or latest symbolic key entries for some user key in a distributed hash table. In some embodiments, the storage system may include a keymap subsystem for managing keymap information and APIs for storing, updating, and retrieving that keymap information in the keymap subsystem for use in accessing data object versions (instances) stored in the system. The storage system may include multiple computing nodes on which data object versions (instances) and keymap information are stored and on which various components of the storage system are implemented.

Figure 6:
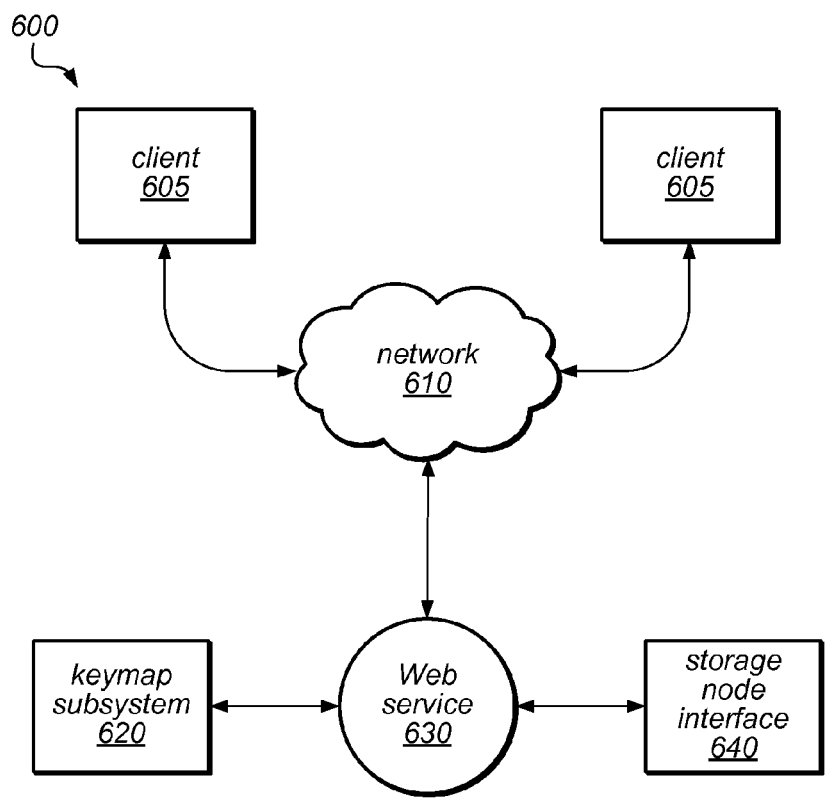
FIG. 6 is a block diagram illustrating a distributed storage network, according to one embodiment.

As noted above, various techniques described herein may be employed in local or remote storage systems, including systems that provide storage services to users (e.g., subscribers) over the Internet, and/or storage systems in a distributed storage network. FIG. 6 illustrates a block diagram of a distributed storage network, according to one embodiment. In this example, the distributed storage network 600 includes one or more storage clients 605. In this example, the storage clients 605 may be configured to interact with a web services interface 630 via a communication network 610. Note that in some embodiments, the distributed storage network may include a load-balancing component (not shown) that is a separate component or that is integrated as a subcomponent of another component of the distributed storage network 600.

Figure 7:
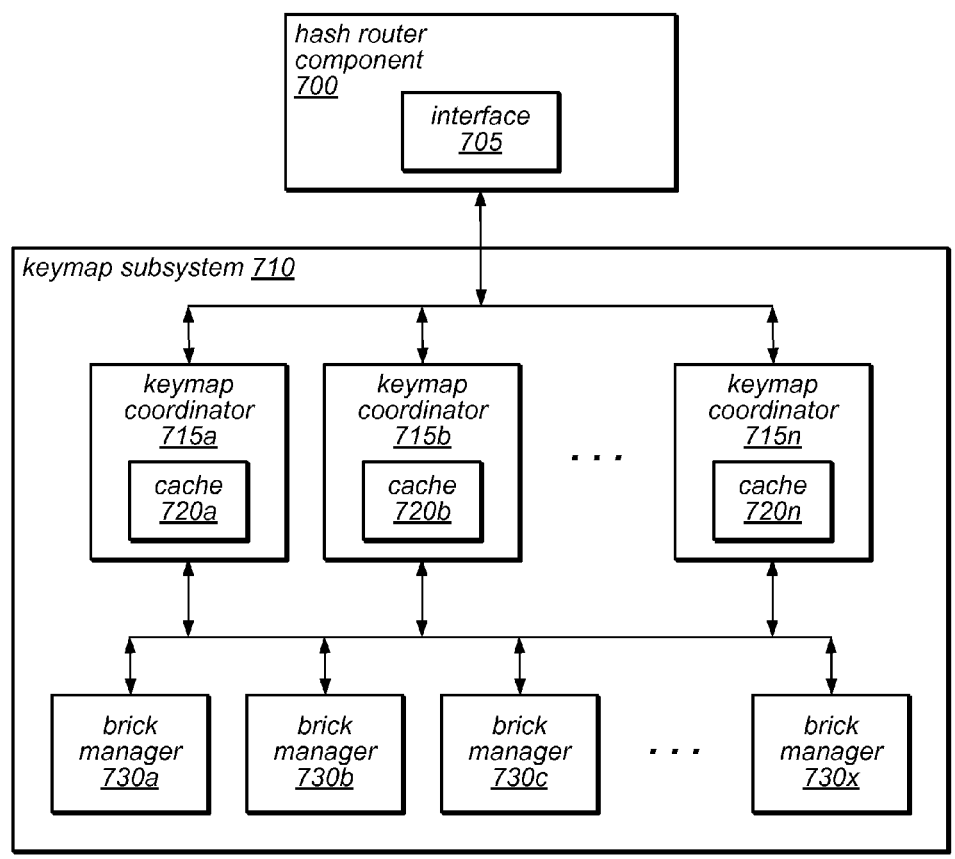
FIG. 7 is a block diagram illustrating one embodiment of a keymap subsystem that may be used to manage keymap information for a distributed storage system.

As illustrated in this example, the web services interface 630 may be configured to communicate with a keymap subsystem 620 to obtain specific mappings of keys to object instance locators. One such keymap subsystem is illustrated in FIG. 7 and described in detail below. The Web services interface 630 may also be configured to communicate with a storage node interface 640 to facilitate the sending of instructions to specific nodes of the distributed storage network 600. For example, the storage node interface 640 may be configured to communicate with a file system, such as via a storage node management (SNM) controller, which may in turn be configured to manage one or more physical storage devices.

The Web service interface 630 may utilize predefined instructions or communications, such as via defined application protocol interfaces (APIs), to communicate with the keymap subsystem 620 and/or storage node interface 640.

In various embodiments, the components illustrated in FIG. 6 may be implemented directly within computer hardware, as instructions directly or indirectly executable by computer hardware (e.g., a microprocessor or computer system), or as a combination of these techniques. For example, the components of the distributed storage network 600 may be implemented by a distributed system including any number of computing nodes (or simply, nodes). In various embodiments, the functionality of a given distributed storage network component may be implemented by a particular node or distributed across several nodes. In some embodiments, a given node may implement the functionality of more than one distributed storage network component.

In the example illustrated in FIG. 6, the storage clients 605 may encompass any type of client configurable to submit Web services requests to Web services interface 630 via network 610. For example, a given storage client 605 may include a suitable version of a Web browser, or a plugin module or other type of code module configured to execute as an extension to or within an execution environment provided by a Web browser. Alternatively, a storage client 605 may encompass an application such as a database application, media application, office application, or any other application that may make use of persistent storage resources. In some embodiments, such an application may include sufficient protocol support (e.g., for a suitable version of Hypertext Transfer Protocol (HTTP)) for generating and processing Web services requests without necessarily implementing full browser support for all types of Web-based data. That is, storage client 605 may be an application configured to interact directly with Web services interface 630. As described below, storage client 605 may be configured to generate Web services requests according to a Representational State Transfer (REST)-style Web services architecture, a document or message-based Web services architecture, or another suitable Web services architecture.

In other embodiments, storage client 605 may be configured to provide access to Web services-based storage to other applications in a manner that is transparent to those applications. For example, storage client 605 may be configured to integrate with an operating system or file system to provide storage in accordance with a suitable variant of the storage model described above. However, the operating system or file system may present a different storage interface to applications, such as a conventional file system hierarchy of files, directories, and/or folders.

In various embodiments, the communication network 610 may encompass any suitable combination of networking hardware and protocols necessary to establish Web-based communications between storage clients 605 and the Web service interface 630. For example, the communication network 610 may generally encompass the various telecommunications networks and service providers that collectively implement the Internet. The communication network 610 may also include private networks such as local area networks (LANs) or wide area networks (WANs) as well as public or private wireless networks. For example, both a given storage client 605 and the Web services interface 630 may be respectively provisioned within enterprises having their own internal networks. In such an embodiment, the communication network 610 may include the hardware (e.g., modems, routers, switches, load balancers, proxy servers, etc.) and software (e.g., protocol stacks, accounting software, firewall/security software, etc.) necessary to establish a networking link between given storage client 605 and the Internet as well as between the Internet and Web services interface 630. It is noted that in some embodiments, storage clients 605 may communicate with Web services interface 630 using a private network rather than the public Internet. For example, storage clients 605 may be provisioned within the same enterprise as the distributed storage network. In such a case, storage clients 605 may communicate with Web service interface 630 entirely through a private communication network (not shown).

FIG. 7 illustrates a block diagram of a keymap subsystem that may be utilized in accordance with the distributed storage network shown in FIG. 6 to manage keymap information, according to one embodiment. As illustrated in this example, keymap subsystem 710 may include any number of keymap functionality coordinators 715 (sometimes referred to herein as keymap coordinators or KFCs). These keymap coordinators may in some embodiments act as a management tier of the keymap subsystem 710, and may be configured to process requests involving associated keymap information. As described in greater detail herein, the keymap subsystem 710 may communicate with one or more hash router components 700, which may be configured to select, or otherwise identify, which keymap coordinator 715 should process requests for keymap information for an identified key.

As illustrated in this example, a hash router component 700 may include an interface component 705 for obtaining consistent hashing information that facilitates the identification of the keymap coordinators 715 that have been assigned to process requests for specific keymap information. As illustrated in FIG. 7, hash router component 700 may be implemented as a stand-alone component separate from the keymap subsystem 710, in some embodiments. In other embodiments, hash router component 700 may be implemented as part of another component with the distributed storage network 600, such as the web service interface component 630 shown in FIG. 6, or another component with the distributed storage network 600. One or more hash router components 700 implemented within the distributed storage network 600 may be accessible by other components via various interfaces, such as application protocol interfaces (APIs).

As illustrated in this example, each of the keymap coordinators 720 may include (or otherwise be associated with) a keymap information cache component 720 for caching keymap information, as described in greater detail below. In various embodiments, the keymap information cache component 720 may be implemented in one or more hardware components, such as internal memory, external memory, shared memory, etc. Accordingly, a keymap cache component 720 may represent a logical cache maintained by a single keymap coordinator 715, or may be shared between multiple keymap coordinators 715. As described herein, a keymap cache component 720 may be logically considered as having separate cache components corresponding to various other components (such as respective keymap coordinators) regardless of whether the keymap cache component is implemented as a single cache or as multiple caches. Accordingly, the logical implementation of each keymap cache component 720 may not need to match the physical implementation of such a keymap cache component within a keymap coordinator 715.

As illustrated in FIG. 7, the keymap subsystem 710 may include a plurality of brick manager components 730 for managing, or otherwise controlling, the storage of keymap information in one or more defined a storage data structures, sometimes referred to herein as "bricks." One or more bricks may be associated with partitions or storage blocks on physical storage devices. The allocation and communication with individual bricks to manage the storage of the keymap information may be controlled through the brick managers 730. In some embodiments, the brick managers 730 may receive input/commands regarding keymap information from other components in the distributed storage network 600. In some cases, the inputs/commands received from the other components (such as reconciler agent daemons or anti-entropy agents, replication agents, repair agents, diagnostic tools, and the like) may be independent of the operations of keymap coordinators 715. In some embodiments, specific brick managers 730 may receive inputs/commands from multiple keymap coordinators 715. As described in greater detail below, in some embodiments, multiple keymap coordinators and other components in the distributed storage system may have the ability and authority to access and modify the keymap information. In some embodiments, the brick manager components 730 may function as the source of keymap information that is cached by the keymap coordinators 715.

In some embodiments, a keymap information request may be processed by the keymap subsystem 710 illustrated in FIG. 7 as in the following example. In this example, a hash router component 700 may receive a keymap information retrieval request, and may direct it toward the specific keymap coordinator 715 associated with an identified key. In this example, the hash router component 700 may utilize a consistent hash scheme for hashing keys to generate a unique hash for each key. The possible hash values, or known hash values, may be subsequently allocated to each of the keymap coordinators 715 in the keymap subsystem 710 via the interface component 705. Accordingly, using the consistent hashing scheme, the hash router component 700 may identify which keymap coordinator 715 should be able to process the received keymap information retrieval request. Note that typical hashing algorithms may store key-value pairs in a hash table according to values generated by applying a hash function to the key. However, as discussed in detail below, in some embodiments, the hash router may use only a portion of the key, and this may allow related key-value pairs to be co-located.

Figure 8B:
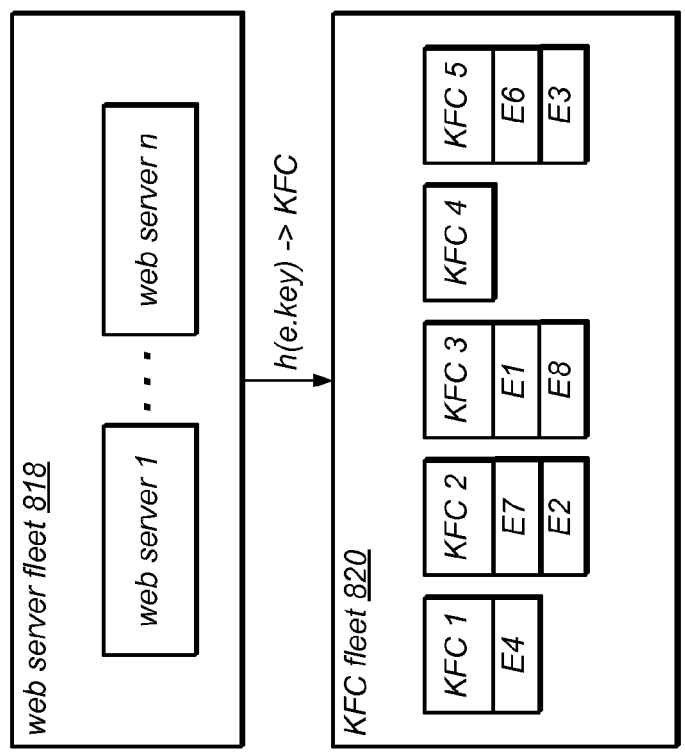
FIGS. 8A and 8B illustrate the mapping of keys to keymap coordinators using a consistent hashing scheme, according to one embodiment.
Figure 8A:
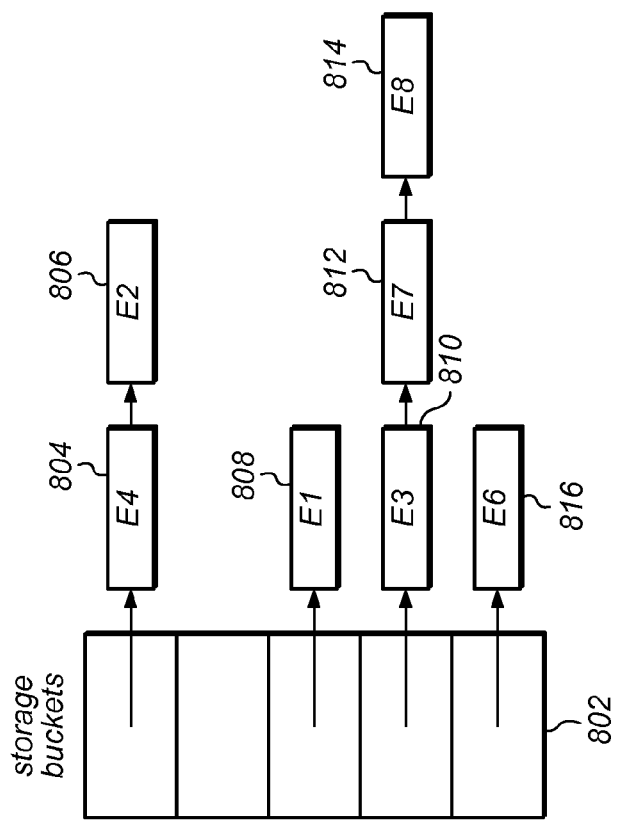

FIGS. 8A and 8B illustrate the mapping of keys (e.g., user keys) to keymap coordinators, according to one such hashing scheme. In this example, a distributed storage system includes a number of storage buckets 802, each of which stores objects having one or more user keys. For example, one bucket stores objects having user keys of E4 (shown in FIG. 8A as 804) and E2 (806). Another bucket stores objects having user key E1 (808). A third bucket stores objects having user keys of E3 (810), E7 (812), and E8 (814). Yet another bucket stores objects having user key E6 (816). As illustrated in FIG. 8B, the keymap information for each of these user keys may be distributed across a fleet of keymap coordinators (shown in FIG. 8B as KFC fleet 820) according to a consistent hashing scheme. In other words, a hash function h is used to map user keys from the storage system domain into the keymap subsystem domain.

As illustrated in this example, the keymap information for various user keys associated with a given storage bucket may be mapped (e.g., physically and/or logically) to different keymap coordinators. For example, a first keymap coordinator (shown as KFC1) may store keymap information for user key E4; another keymap coordinator (KFC2) may store keymap information for user keys E7 and E2; a third keymap coordinator (KFC3) may store keymap information for user keys E1 and E8; and a fourth keymap coordinator (KFC5) may store keymap information for user keys E6 and E3. Note that in other embodiments, there may be a one-to-one mapping between the user keys associated with a given storage bucket and a respective keymap coordinator (physically or logically). In this example, when a request for keymap information is sent from a web server of a web server fleet 818 to a KFC fleet 820, the particular key for which keymap information is requested may be hashed using the same hash function h in order to route the request to the appropriate keymap coordinator in KFC fleet 820.

Figures 9A, 9B:
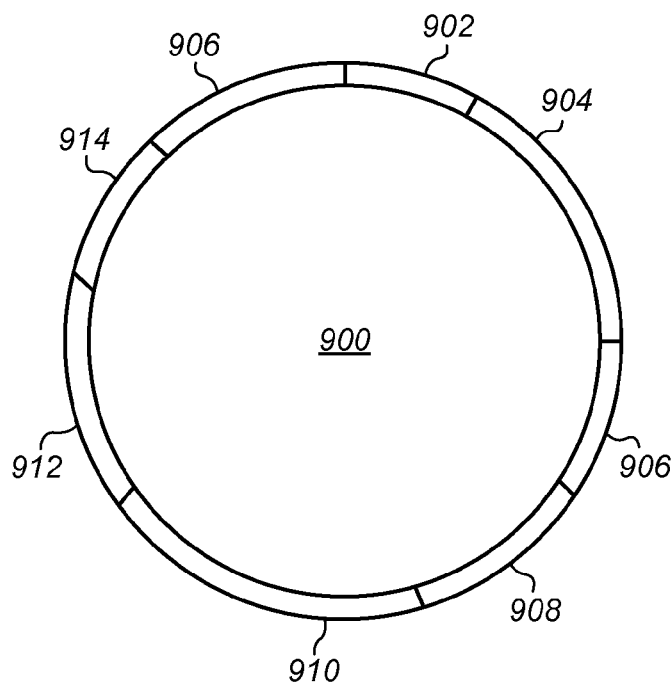
FIGS. 9A and 9B illustrate the distribution of different hash value ranges across multiple keymap coordinators, according to one embodiment.

The selection of keymap coordinators from a keymap subsystem utilizing the consistent hashing of keymap information (according to some embodiments) may be further illustrated by the example shown in FIGS. 9A and 9B. In this example, various keymap coordinators (which may be similar to the keymap coordinators 715 illustrated in FIG. 7 and described above) may be selected for the storage of keymap information and/or for processing keymap information requests. As previously described, a hash router component (e.g., one similar to hash routing component 700 of FIG. 7 and described above) may utilize a consistent hash scheme for hashing keys to generate a unique hash for each key. In this example, the set of potential, or known hash values, may be represented as a ring 900. As illustrated in FIG. 9, this ring 900 of potential hash values may be further broken down into a set of hash value ranges 902, 904, 906, 908, 910, 912, 914, and 916. As shown in this example, the ranges defined for each keymap coordinator may be of different lengths. Alternatively, the hash value ranges may be of equal size.

As illustrated by table 920 in FIG. 9B, each of the hash value ranges in the ring 900 may be mapped to one of the keymap coordinators in the keymap subsystem. In one embodiment, each keymap coordinator may be associated with a single range with the ring 900. In other embodiments, such as that illustrated in FIGS. 9A and 9B, some or all of the keymap coordinators in a keymap subsystem may be associated with multiple ranges of hash values. In some such embodiments, each keymap coordinator may be associated with the same number of hash value ranges. Table 920 illustrates the assignment of ranges 902-916 in the ring 900 to keymap coordinators "KFC1," "KFC2," "KFC3" and "KFC4" in a keymap subsystem. As illustrated in columns 922 and 924 of the table 920, each keymap coordinator is associated with more than one range from the ring 900, in this example. Note that the assignment of ranges with the ring does not necessarily have to follow a consistent order or pattern. For example, in various embodiments, the order of the assignment of hash value ranges to keymap coordinators may be random, or may be determined in accordance with selection/processing criteria other than, or in addition to, a consistent hashing scheme.

As previously described, hash router components may be associated with or found in various components within a distributed storage network. For example, a Web services interface may include a hash router component for directing requests to an appropriate keymap coordinator. In such an embodiment, individual copies of a mapping table, such as table 920, may be maintained at each hash router component via its interface component. The information associated with the definition of hash ring ranges and their assignments to keymap coordinators, as well as any other information associated with the selection of keymap coordinators, may be generally referred to as "hash routing information." In some embodiments, various hash router components may utilize various protocols to update or propagate the hash ring range information. For example, the distributed storage network may utilize a peer-to-peer distribution communication protocol, such as a gossip (or epidemic) computer to computer communication protocol, to allow various components within the distributed storage network to maintain updated (and, eventually, consistent) hash ring range information among the hash router components. In such an embodiment, each hash router component may transmit and receive the hash routing information from other, known hash router components, but each hash router component may not need to know about all possible hash router components in the distributed storage network. In some embodiments, each hash router component may process information from multiple hash router components to determine the most current version of the hash routing information. Accordingly, in such embodiments, the selection of an appropriate keymap coordinator may be implemented as a non-centralized process in which the hash routing information is updated within the distributed storage network.

As previously described, in some embodiments, the keymap coordinators may implement a cache component for maintaining keymap information. The cache component may be a proxy cache that maintains keymap information (e.g., keymap values) for each of the brick managers associated with, or otherwise in communication with, the corresponding keymap coordinator. In such embodiments, a keymap coordinator may be able to utilize cached keymap information in response to a keymap retrieval request. In some embodiments, the keymap coordinators may utilize memory optimization techniques for maintaining keymap information for a plurality of brick manager components. In some embodiments, the keymap coordinators may utilize generation identifier information to manage the keymap information maintained in their cache components.

Figure 10:
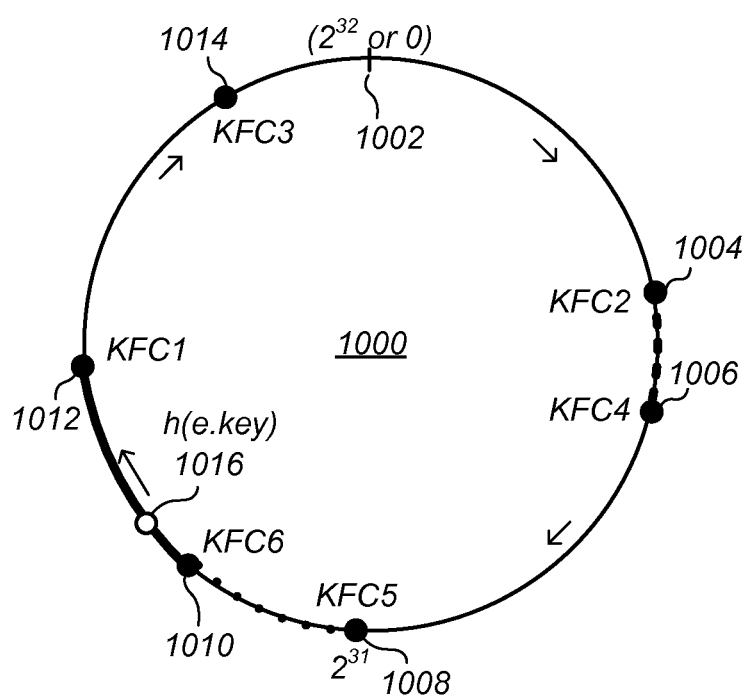
FIG. 10 illustrates the mapping of a particular hash value to the keymap coordinator on which corresponding keymap information is cached, according to one embodiment.

FIG. 10 illustrates the mapping of a particular hash value (i.e. a hash value generated from a particular key or a portion thereof) to the keymap coordinator on which corresponding keymap information is cached and/or otherwise stored, according to one embodiment. In this example, ring 1000 represents a ring of hash values that may be generated from keys in the storage system, and these values range from 0 to ($2^{32}$–1). Each point on ring 1000 corresponds to a hash value that may be generated from a key according to a hash function h. In this example, the hash values contain 32 bits, and point 1002 represents a hash value of zero (or, alternatively, $2^{32}$).

In this example, the points labeled KFC1 (1012), KFC2 (1004), KFC3 (1014), KFC4 (1006), KFC5 (1008), and KFC6 (1010) represent the last hash value in a range corresponding to the named keymap coordinator. For example, point 1010 corresponds to the last hash value in the range of hash values cached by keymap coordinator KFC6, according the hash function: h(KFC6.id). In this example, all of the hash values on ring 1000 in the range of values between this value and the hash value represented by point 1012 (shown in bold on ring 1000 while moving clockwise) are cached by KFC1. Similarly, the hash values in the range of hash values between those of points 1004 and 1006 (shown by the dashed line in FIG. 10) are cached by KFC4; the hash values in the range of hash values between those of points 1008 and 1010 (shown by dotted line in FIG. 10) are cached by KFC6; and so on.

In this example, if the hash value generated from a given key corresponds to point 1016 on ring 1000, the keymap coordinator on which keymap information for this key should be stored and/or from which it should be retrieved may be found by moving clockwise on ring 1000 from point 1016 to the point corresponding to the next keymap coordinator boundary (in this case, point 1012). This point corresponds to KFC1, and identifies KFC1 as the keymap coordinator for keymap information for the given key.

In embodiments that employ latest symbolic key entries, when a web services interface issues a PUT request to the keymap subsystem, an additional parameter may be added to the PUT operation to support this mechanism. For example, a PUT request may include an "update-nearest" parameter (which may indicate that a cache entry for the latest symbolic key may need to be updated). More specifically, this parameter may indicate to the KFC that the PUT operation may affect the value mapped to the latest symbolic key for a given user key and that the KFC should attempt to either update the latest symbolic key entry for the given user key in its cache or invalidate it from the cache. This parameter may be Boolean in type, in various embodiments. In some embodiments, the update-nearest parameter may be implemented as a flag to be included in requests and responses only if it is "true", or as a parameter that is always included in the appropriate request and response messages and that has one of two or more values (including "true" and "false").

Figure 11:
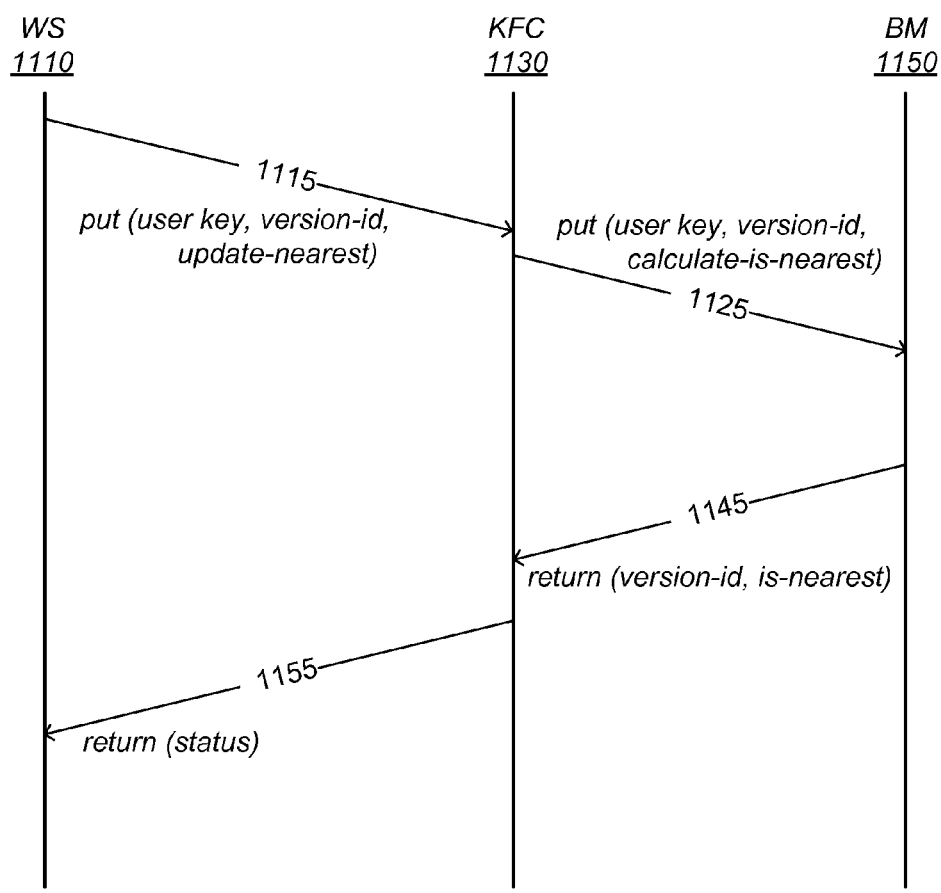
FIG. 11 is a data flow diagram illustrating the use of an update-nearest parameter, according to some embodiments.

FIG. 11 is a data flow diagram illustrating the use of this additional parameter, according to some embodiments. As illustrated in this example, a web service interface of a distributed storage system (shown as WS 1110) may issue a request to the keymap subsystem to store keymap information for a PUT type operation. For example, a request to PUT a data object may be received from a user (e.g., a storage service subscriber) or a requesting application, in various embodiments, and WS 1110 may issue a request to store keymap information for that PUT operation. This request (shown as 1115) may include a user key for the data object to be put, a version-id for the data object to be put, and a value for the Boolean parameter update-nearest. As described herein, the request may be routed to an appropriate keymap coordinator (shown as KFC 1130) according to a consistent hashing scheme applied to keys (or portions thereof). The KFC 1130 may pass a similar request to an appropriate brick manager (shown as BM 1150), and this request (shown as 1125) may include the user key, the version-id, and a value for the Boolean parameter "calculate-is-nearest". If the KFC sees that the value of the flag "update-nearest" is true, it may set the value of the parameter "calculate-is-nearest" to true in request 1125.

As described above, BM 1150 may store the keymap information for the PUT operation in a particular storage partition or block (brick), in some embodiments. As illustrated in this example, if this calculate-is-nearest flag is set to true, the brick manager (BM 1150) may also attempt to calculate whether the data object being put will be the latest version of the objects stored in the storage system having the specified user key (i.e. whether it corresponds to the "nearest" version of the user key within the context of the block in which keymap information for objects having the specified user key are being stored). BM 1150 may return a response to request 1125 that includes the version-id value of the data object being put, and a value for an "is-nearest" parameter. This response is shown as 1145 in FIG. 11. If BM 1150 is able to determine that the version-id corresponds to the "nearest" version of the specified user key without performing any additional block loads, the response 1145 may include an "is-nearest" flag that is set to "NEAREST". If BM 1150 is able to determine that the version-id does not correspond to the "nearest" version of the specified user key, the response 1145 may include an "is-nearest" flag that is set to "NOT-NEAREST". If BM 1150 cannot determine whether the version-id corresponds to the "nearest" version of the specified user key, the response 1145 may include an "is-nearest" flag that is set to "UNKNOWN".

As illustrated in this example, if response 1145 indicates that the version-id corresponds to the "nearest" version of the specified user key, KFC 1130 may update the latest symbolic key entry updated for this user key to indicate that the version-id included in response 1145 corresponds to the latest version of the specified user key. For example, it may replace a value currently mapped to the latest symbolic key in a latest symbolic key entry (e.g., a special sentinel value or another version-id value that was previously mapped to the latest symbolic key) with this version-id. If response 1145 does not indicate that the version-id corresponds to the "nearest" version of the specified user key (i.e. if the response includes an is-nearest flag value of NOTNEAREST or UNKNOWN), KFC 1130 may remove or invalidate the latest symbolic key entry for the specified user key in the KFC cache. As illustrated in FIG. 11, KFC 1130 may return an indication of the status of this operation (i.e. the operation to store keymap information for a newly PUT object) to the Web service interface (1110). For example, the response may include an indication that the operation to store keymap information was successful or (if it was not successful) may include an error indication.

Figure 12:
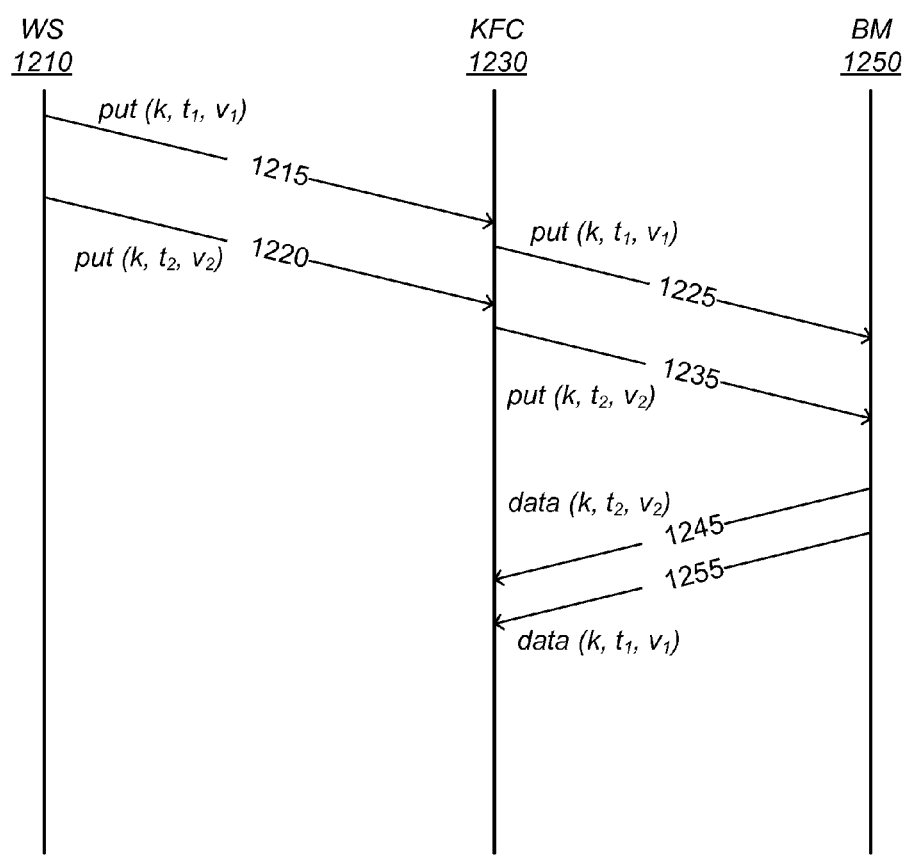
FIG. 12 is a data flow diagram illustrating the behavior of a keymap subsystem in response to requests to put keymap information that are performed in a different order than they were issued, according to some embodiments.

In some embodiments, the storage system may employ various mechanisms to assist in achieving eventual consistency in the system, e.g., when updates to keymap information are performed in a different order than the order in which they were issued. For example, in some embodiments, timestamp values (e.g., the sequencers described above) may be included in keymap access requests and responses to prevent errors due to out-of-order processing of requests. FIG. 12 is a data flow diagram illustrating the behavior of a keymap subsystem in response to requests to put keymap information that are performed in a different order than they were issued, according to some embodiments. In this example, two such requests are issued from a Web services interface (WS 1210). These requests (shown as 1215 and 1220) correspond to two different put operations for the same user key (k). The requests include timestamp values ($t_1$ and $t_2$) indicating, e.g., the time at which each request was issued, or the time at which the corresponding version-id values ($v_1$ and $v_2$) for the put operations were generated. In this example, request 1215 was issued prior to request 1220. As described herein, the requests may be routed to the appropriate keymap coordinator (KFC 1230) in the keymap subsystem for the specified key according to a consistent hashing scheme, and KFC 1230 may pass the requests on to an appropriate brick manager (BM 1250) as requests 1225 and 1235, respectively.

In this example, request 1225 is passed to BM 1250 prior to request 1235. However, the response to request 1235 (shown as 1245) is returned prior to the response to request 1225 (shown as 1255). If timestamps had not been included in each of the original requests, KFC 1230 may (after response 1255) update a latest symbolic key entry in its cache incorrectly. For example, when BM 1250 stores keymap information for version $v_2$ of the user key to a brick and returns response 1245 to KFC 1230, KFC 1230 may update the latest symbolic key entry for k to indicate that $v_2$ is the latest version of the stored objects that have the user key k. Later, if BM 1250 stores keymap information for version $v_1$ of the user key to a brick and returns response 1255 to KFC 1230, KFC 1230 might have updated the latest symbolic key entry for k to indicate that $v_1$ is the latest version of the stored objects that have the user key k. However, this would have been incorrect, as the PUT operation corresponding to version-id $v_2$ was issued more recently. In some embodiments, the keymap subsystems described herein may employ timestamp values and/or other mechanisms to prevent such incorrect updates to latest symbolic key entries. For example, if the timestamp values $t_1$ and $t_2$ are included in responses 1245 and 1255, respectively, the KFC may examine those timestamp values and compare them to a sequencer value stored in the latest symbolic key entry (which, as described above, may correspond to and/or have been generated from a timestamp value in a previous operation) before deciding whether to update (or even invalidate) the latest symbolic key entry. For example, when response 1255 is returned and includes an earlier timestamp ($t_1$) than a timestamp corresponding to the sequencer portion of the version-id stored in the latest symbolic key entry after the receipt of response 1245 (which included timestamp $t_2$), the KFC may remove or invalidate this cache entry, rather than incorrectly updating it with the information from response 1255. In other words, the KFC may not update the latest symbolic key entry for a given user key (but may remove or invalidate it) if it receives a response from the brick manager that includes a timestamp/sequencer value higher (older) than one already stored in the latest symbolic key entry for that user key.

In some embodiments, the storage system may provide another mechanism that may be employed in a keymap storage system to assist the system in achieving eventual consistency. This mechanism employs a special sentinel value (e.g., a different sentinel value than the sentinel value for an implicit object version) in one or more KFC cache entries (including a latest symbolic key entry) to indicate that an update of the keymap information and/or an update of a latest symbolic key entry is in progress for a given user key.

Figure 13:
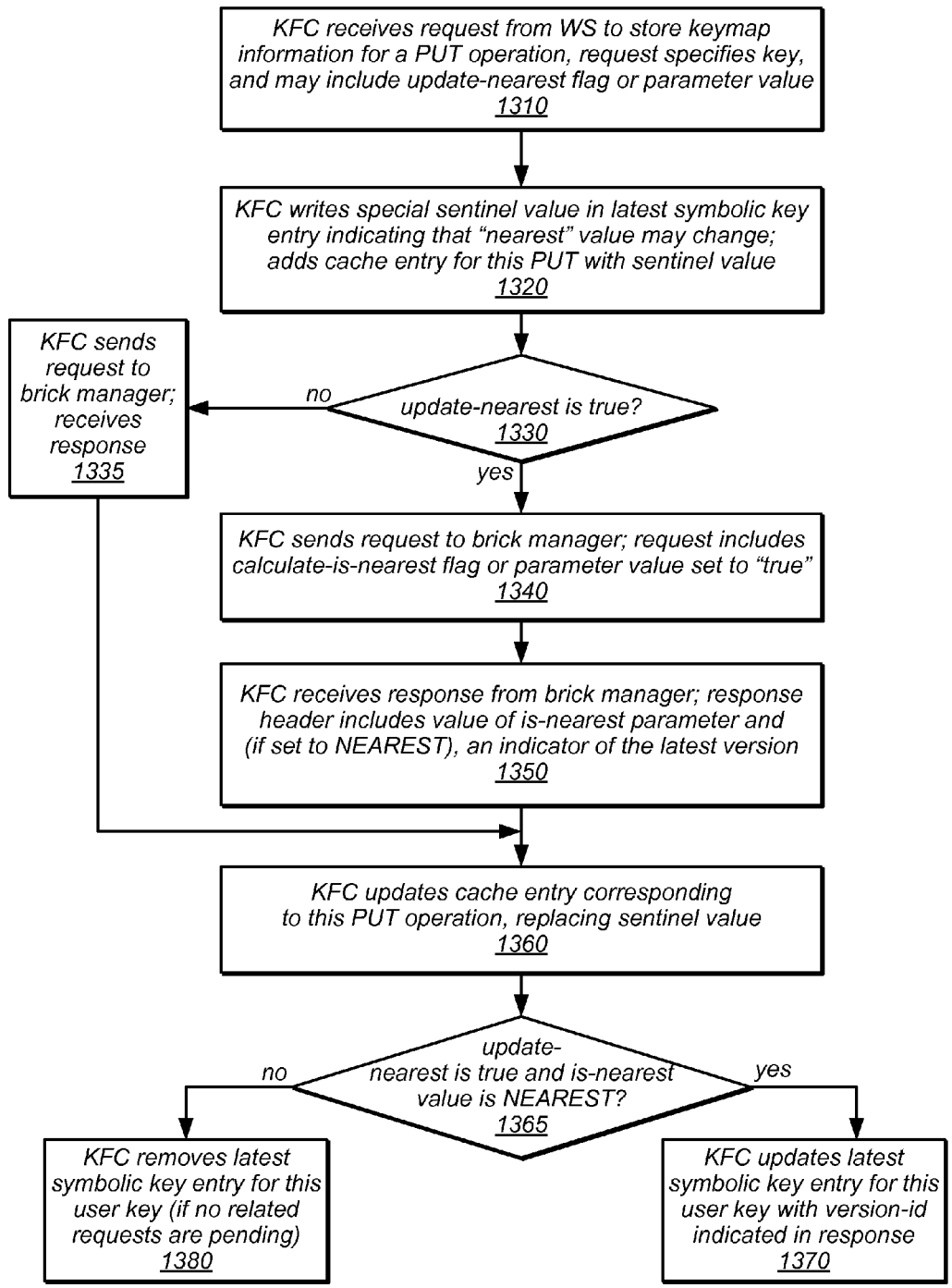
FIG. 13 is a flow diagram illustrating a method for a keymap coordinator (KFC) to update keymap information in the keymap subsystem of a distributed storage system, according to some embodiments.

One embodiment of a method for a keymap coordinator (KFC) to update keymap information in a keymap subsystem of a distributed storage system is illustrated by the flow diagram in FIG. 13. As illustrated at 1310, in this example, the method may include the KFC receiving a request from a web services interface (WS) to store keymap information for a PUT type operation, and the request may specify a particular key (which may be a composite key that includes at least a user key). For example, the web services interface may send this request to the KFC in response to a receiving a request from a user (e.g., a storage service subscriber) or a requesting application to PUT a data object in a distributed storage system that supports versioning. As illustrated in this example, and described above, the request may include an update-nearest parameter whose value indicates whether there is a possibility that the data object being put will be the latest version of the objects stored in the distributed storage system having the specified user key. In such embodiments, the web services interface may set the value of this parameter to true if the specified key belongs to a versioned object or an object in a versioned bucket in the storage system. In other embodiments, the web services interface may include an update-nearest flag in the request (or send an update-nearest flag along with the request) if the specified user key belongs to a versioned object or an object in a versioned bucket in the storage system. If the specified user key does not belong to a versioned object or bucket, the web services interface may set the value of the parameter update-nearest parameter to false (or may not include an update-nearest flag in, or along with the request).

As illustrated in FIG. 13, the method may include the KFC writing a special sentinel value in the latest symbolic key entry for the specified user key indicating that the "nearest" version-id value for this user key may change, as in 1320. In other words, the KFC may replace the value mapped to the latest symbolic key in the latest symbolic key entry with this special sentinel value. Note that overwriting the value for the latest symbolic key entry may be used to effectively invalidate the latest symbolic key entry, on the assumption that the PUT operation (or another operation in progress) will affect the latest symbolic key entry even if the update-nearest flag is not set. For example, other operations in progress may affect the latest symbolic key entry, and the absence of this flag (or a corresponding parameter value of "false") may merely indicate that it is unknown whether the PUT operation will affect the latest symbolic key entry. As illustrated in this example, the method may also include the KFC adding (or updating) a cache entry for this PUT request and setting the value that is mapped to the particular key specified for the PUT operation in this cache entry to a special sentinel value (e.g., the same sentinel value or a different sentinel value, in various embodiments) to indicate that an operation is in progress.

As illustrated in this example, if the update-nearest parameter value is false (or no update-nearest flag is sent with the request), shown as the negative exit from 1330, the method may include the KFC sending the request to a brick manager, and receiving a response from the brick manager indicating that the keymap information for the PUT operation has been stored in a brick, as in 1335. Note that in this case, although the latest version may change, no attempt will be made to calculate the latest symbolic key entry for the specified user key.

If the update-nearest parameter value is true (or if an update-nearest flag is sent with the request), shown as the positive exit from 1330, the method may also include the KFC sending the request to a brick manager, and the request may include a calculate-is-nearest flag or a calculate-is-nearest parameter value set to "true", as in 1340. As illustrated at 1350, the KFC may receive a response from the brick manager indicating that the keymap information for the PUT operation has been stored in a brick, and the response header may include a value of an is-nearest parameter. If the is-nearest parameter is set to NEAREST, indicating that the data object being PUT will be the latest version of the objects stored in the distributed storage system having the specified user key, the response may also include an identifier of the version-id of this latest version.

As illustrated in FIG. 13, after receiving a response from the brick manager, the KFC may update the cache entry corresponding to this PUT to replace the special sentinel value in the entry with some or all of the keymap information (e.g., an inode) for the data object being PUT, as in 1360. In addition, if the update-nearest parameter value is true (or if an update-nearest flag was sent with the request) and the value of the is-nearest parameter is NEAREST, shown as the positive exit from 1365, the KFC may update the latest symbolic key entry for the specified user key, i.e. the KFC may replace the sentinel value mapped to the latest symbolic key with the version-id value returned in the response from the brick manager, as in 1370. If the update-nearest parameter value is false (or if no update-nearest flag was sent with the request) and/or if the value of the is-nearest parameter is not NEAREST (e.g., if it is NOTNEAREST or UNKNOWN), shown as the negative exit from 1365, the method may include the KFC removing (or invalidating) the latest symbolic key entry for the specified user key in its cache (assuming there are no related requests pending), as in 1380. If there are pending requests specifying this user key, the sentinel value may be maintained in the latest symbolic key entry for this user key until all of the pending requests have been resolved, as described in more detail below.

Figure 14:
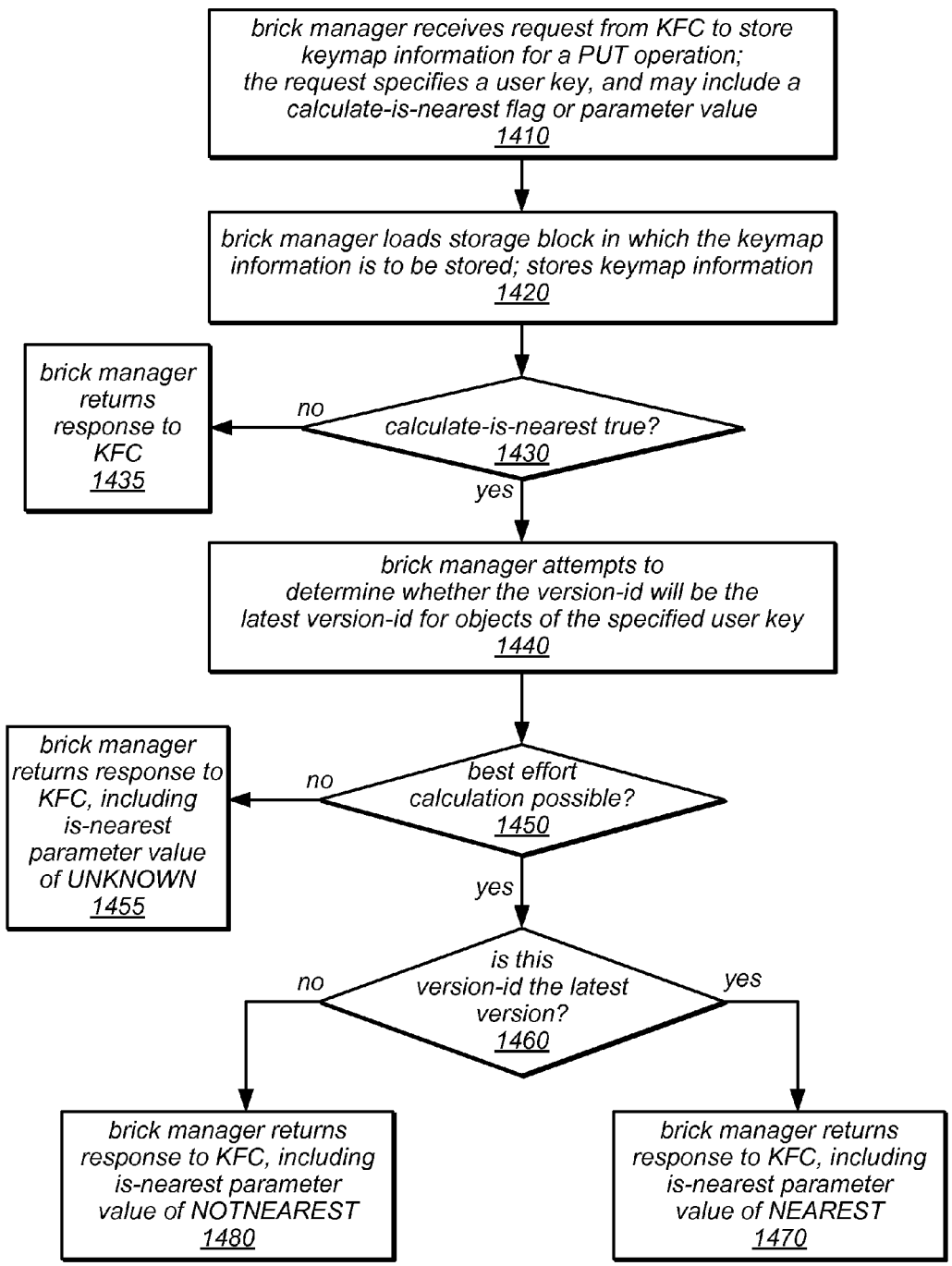
FIG. 14 is a flow diagram illustrating a method for a brick manager to update keymap information in a keymap subsystem of a distributed storage system, according to some embodiments.

One embodiment of a method for a brick manager to update keymap information in a keymap subsystem of a distributed storage system is illustrated by the flow diagram in FIG. 14. As illustrated at 1410, in this example, the method may include the brick manager receiving a request from a keymap coordinator (KFC) to store keymap information for a PUT operation, and this request may specify a particular key (which may include at least a user key). As described above, the request may include a calculate-is-nearest flag or parameter value whose value (or presence) is determined by the KFC. As illustrated in this example, the method may include the brick manager loading a particular storage partition or block (brick) in which the keymap information is to be stored, and storing the keymap information for this PUT operation in persistent storage in the particular storage partition or block (brick), as in 1420. If the calculate-is-nearest flag is not included in the request (or the value of such a parameter is false), shown as the negative exit from 1430, the method may include the brick manager returning a response to the KFC indicating that the keymap information has been stored, as in 1435.

If the calculate-is-nearest flag is included in the request (or the value of such a parameter is true), shown as the positive exit from 1420, the method may include the brick manager attempting to determine whether the version-id for this PUT operation will be the latest version-id for the objects having the specified user key. If a best effort calculation of the latest version is not possible, shown as the negative exit from 1450, the brick manager may return a response to the KFC indicating that the keymap information has been stored, and the response may include an is-nearest parameter value of UNKNOWN, as in 1455. Note that in some embodiments a parameter value of UNKNOWN may be returned if the keymap information needed to determine the latest object version for the user key crosses a block boundary, for example, and cannot be easily or efficiently accessed by the brick manager. Note that the is-nearest parameter value may be included in the response header, in some embodiments.

If a best effort calculation of the latest version is possible, shown as the positive exit from 1450, and the brick manager determines that the version-id will be the latest version of the object with the specified user key (shown as the positive exit from 1460), the brick manager may return a response to the KFC indicating that the keymap information has been stored, and the response may include an is-nearest parameter value of NEAREST, as in 1470. If a best effort calculation of the latest version is possible, shown as the positive exit from 1450, and the brick manager determines that the version-id will not be the latest version of the object with the specified user key (shown as the negative exit from 1460), the brick manager may return a response to the KFC indicating that the keymap information has been stored, and the response may include an is-nearest parameter value of NOTNEAREST, as in 1480.

Various APIs supported in a distributed storage system may be modified to employ (or take advantage of) a latest symbolic key entry, such as that described above. For example, the code for a GET type operation at a keymap coordinator (e.g., a KFC GET API) may accept a new parameter, "update-nearest", which indicates that the latest symbolic key entry for a user key specified in a GET type operation may need to be updated. In some embodiments, this parameter may not be used for the GET interaction itself, but may used when a repair interaction is initiated in the KFC. For example, a repair may trigger a PUT operation, and this parameter may be used to update the latest symbolic key entry in the KFC cache, as discussed herein.

In some embodiments, a new API, "GETNEAREST", may be supported by keymap subsystem (e.g., by the keymap coordinators and brick managers). The parameters and the response of the GETNEAREST API may be simple. For example, GETNEAREST may require only on input parameter (a user key) and may include other optional parameters. In some embodiments, the semantics for these parameters may be same as in the GET call described above. In some embodiments, the response of GETNEAREST may also be similar to that of the GET call, albeit with different response verbs (e.g., GETNEARESTDATA and GETNEAREST-NOKEY).

Figure 15:
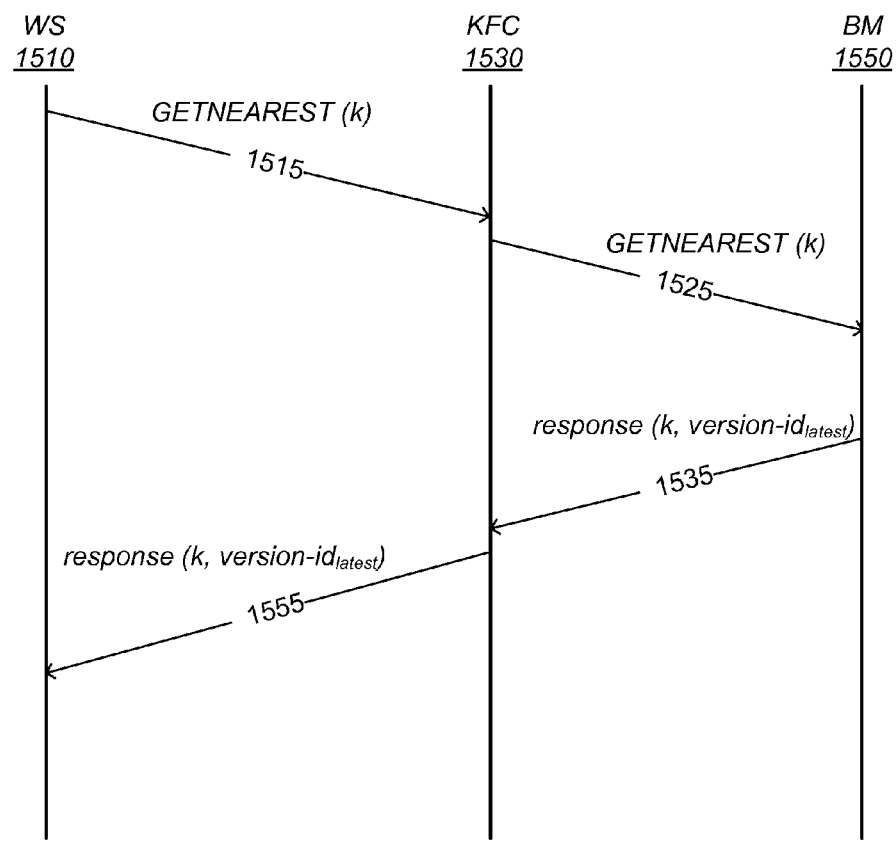
FIG. 15 is a data flow diagram illustrating the behavior of a keymap subsystem in response to a request to retrieve information identifying the latest version of a stored data object, according to some embodiments.

FIG. 15 is a data flow diagram illustrating the behavior of a keymap subsystem in response to a request to retrieve information identifying the latest version of the objects stored in a distributed storage system and having a specified user key, according to some embodiments. As illustrated in this example, a GETNEAREST request 1515 may be sent from a web services interface (WS 1510) to a keymap subsystem, which may route it to an appropriate keymap coordinator (KFC 1530), and the request may include a particular user key (k). For example, the GETNEAREST request may be initiated directly by a user (e.g., a storage system subscriber) or requesting application through the web services interface, or may be initiated by the web services interface in response to a request that depends on this information, in various embodiments. In some embodiments, a hash router component of the keymap subsystem may determine an appropriate KFC to process the request using a consistent hashing scheme based on the key (or a portion thereof), as described herein.

As illustrated in this example, KFC 1530 may route the GETNEAREST request to an appropriate brick manager (BM 1550) as request 1525. Brick manager 1550 may determine the version-id of the latest version of the objects stored in the distributed storage system having the specified user key, using any of the techniques described herein or any other suitable technique, and may return a response 1535 to KFC 1530 that includes the user key and the version-id for the latest version of the objects with that user key. In some embodiments, KFC 1530 may create or update one or more entries in its cache (e.g., a latest symbolic key entry for this user key, and/or a cache entry for the particular data object version) to reflect this information, and/or may return a response 1555 to WS 1510 including this information. The web services interface may use this information to access the data object instance associated with the information and return it to the requester in a GETNEARESTDATA response (not shown). In some embodiments, if no objects are stored in the distributed storage having the specified user key, a response of GETNEARESTNOKEY may be returned from brick manager 1550 to KFC 1530, from KFC 1530 to WS 1510, and from WS 1510 to the requester.

Figure 16:
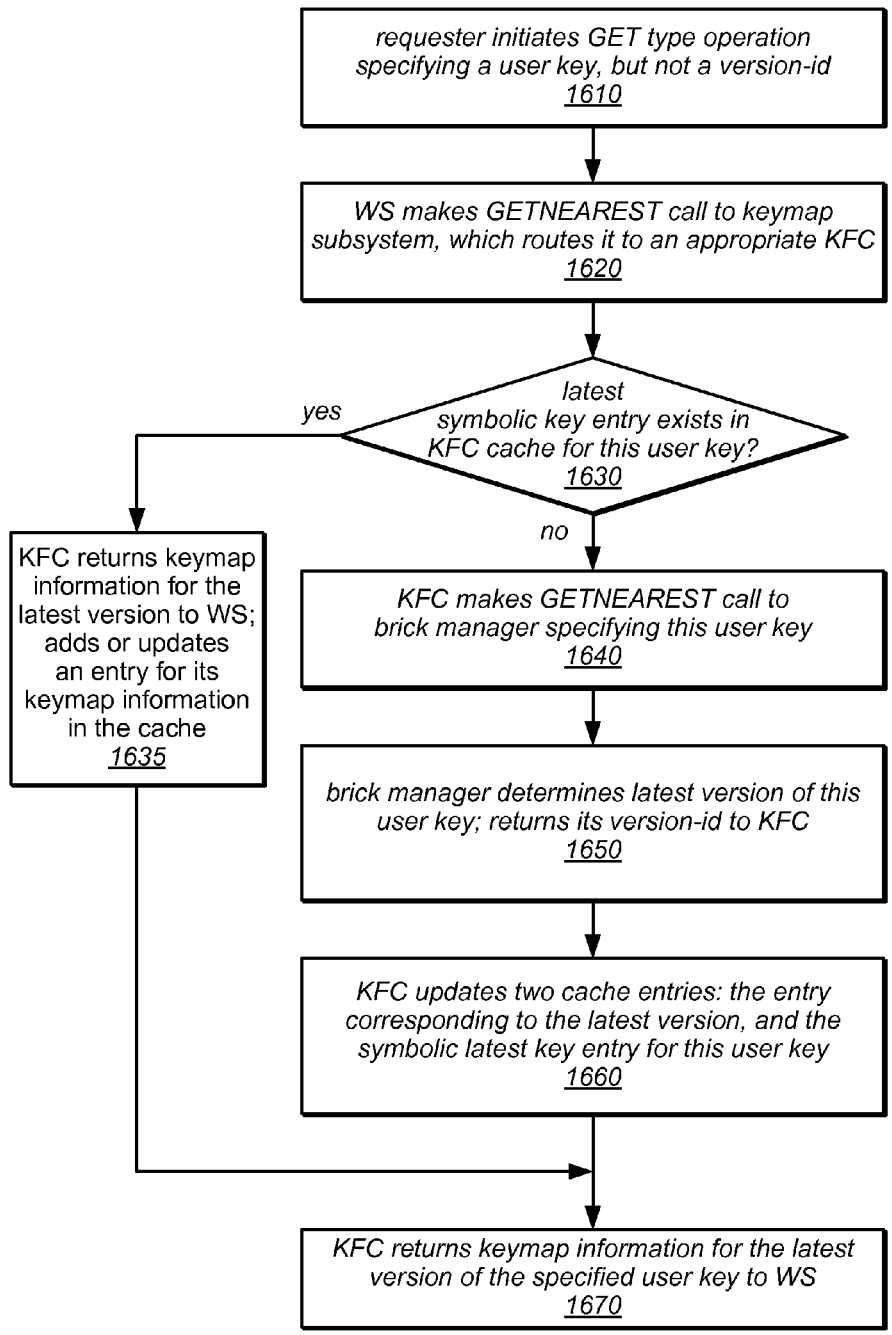
FIG. 16 is a flow diagram illustrating a method for a fetching the latest version of a data object that is stored in a distributed storage system, according to some embodiments.

One embodiment of a method for a fetching the latest version of a data object stored in a distributed storage system is illustrated by the flow diagram in FIG. 16. As illustrated at 1610, in this example, the method may include a requester initiating a GET type operation specifying a user key, but not a version-id. For example, in some embodiments a user (e.g., a storage system subscriber) or requesting application may submit a request for a data object with a given user key (without specifying a version-id) through a web services interface (WS). The web service interface may make a GETNEAREST call to keymap subsystem, which may route it to an appropriate KFC, as in 1620. For example, a hash routing component of a keymap subsystem may determine an appropriate KFC to which the request should be routed using a consistent hashing scheme, as described above.

As illustrated in this example, if a latest symbolic key entry exists in the KFC cache for this user key, shown as the positive exit from 1630, the method may include the KFC returning the keymap information for the latest version to the web services interface (e.g., as identified in the latest symbolic key entry), as in 1635. The method may also include the KFC adding or updating an entry with the keymap information for latest version in its cache. If no latest symbolic key entry exists in the KFC cache for this user key, shown as the negative exit from 1630, the method may include the KFC making a GETNEAREST call to the brick manager specifying this user key, as in 1640. In some embodiments, the brick manager may then determine the latest version-id for this user key, and may return it (along with an indication that this is the latest version-id and/or the keymap information associated with this latest version-id) to the KFC, as in 1650. For example, the brick manager may examine two or more keymap information entries stored in persistent storage to determine the latest version of the object (e.g., by comparing a sequencer or timestamp portion of the version-id in each of the entries, by comparing the two leading entries in keymap information that is sorted by user key and then by version-id, as described above, or by any other suitable means).

In some embodiments, in response to receiving keymap information for the latest version-id (and an indication of the latest version-id value), the KFC may add or update the values in two cache entries accordingly: the entry corresponding to the latest version-id, and the symbolic latest key entry for this user key, as in 1660. The KFC may then return the keymap information (including, for example, a inode) for the latest version of the specified user key to the web services interface, as in 1670. Note that the web services interface may use this information to locate and fetch the desired data object itself in the distributed storage system (not shown). For example, in some embodiments, the web services interface may communicate some or all of the keymap information to a storage node interface in the distributed storage unit (such as storage node interface 640 in FIG. 6).

In some embodiments, keymap information (including, in some cases, a latest symbolic key entry) may need to be updated following an operation to delete a data object instance stored in the storage system. One embodiment of a method for updating keymap information following a DELETE operation in a distributed storage system is illustrated by the flow diagram in FIG. 17. Note that this method may or may not be applicable in the case of a logical delete (described above), which may be treated in the keymap subsystem as if it were a PUT operation for a new delete marker object. As illustrated at 1710, in this example, the method may include a requester (e.g., a user or requesting application) initiating a DELETE type operation that specifies a user key. The web services interface may send the delete request to the keymap subsystem, which may route the request to an appropriate KFC for processing, as in 1720. As illustrated in this example, the method may include the KFC writing a special sentinel value in the latest symbolic key entry for the specified user key indicating that the "nearest" version-id value for this user key may change, as in 1730. Note that overwriting the latest symbolic key entry may be used to effectively invalidate the latest symbolic key entry, on the assumption that the DELETE will affect the latest symbolic key entry. The method may also include the KFC adding (or updating) a cache entry for this request and setting the value in this cache entry to a special sentinel value (e.g., the same sentinel value or a different sentinel value, in various embodiments) to indicate that an operation is in progress.

Figure 17:
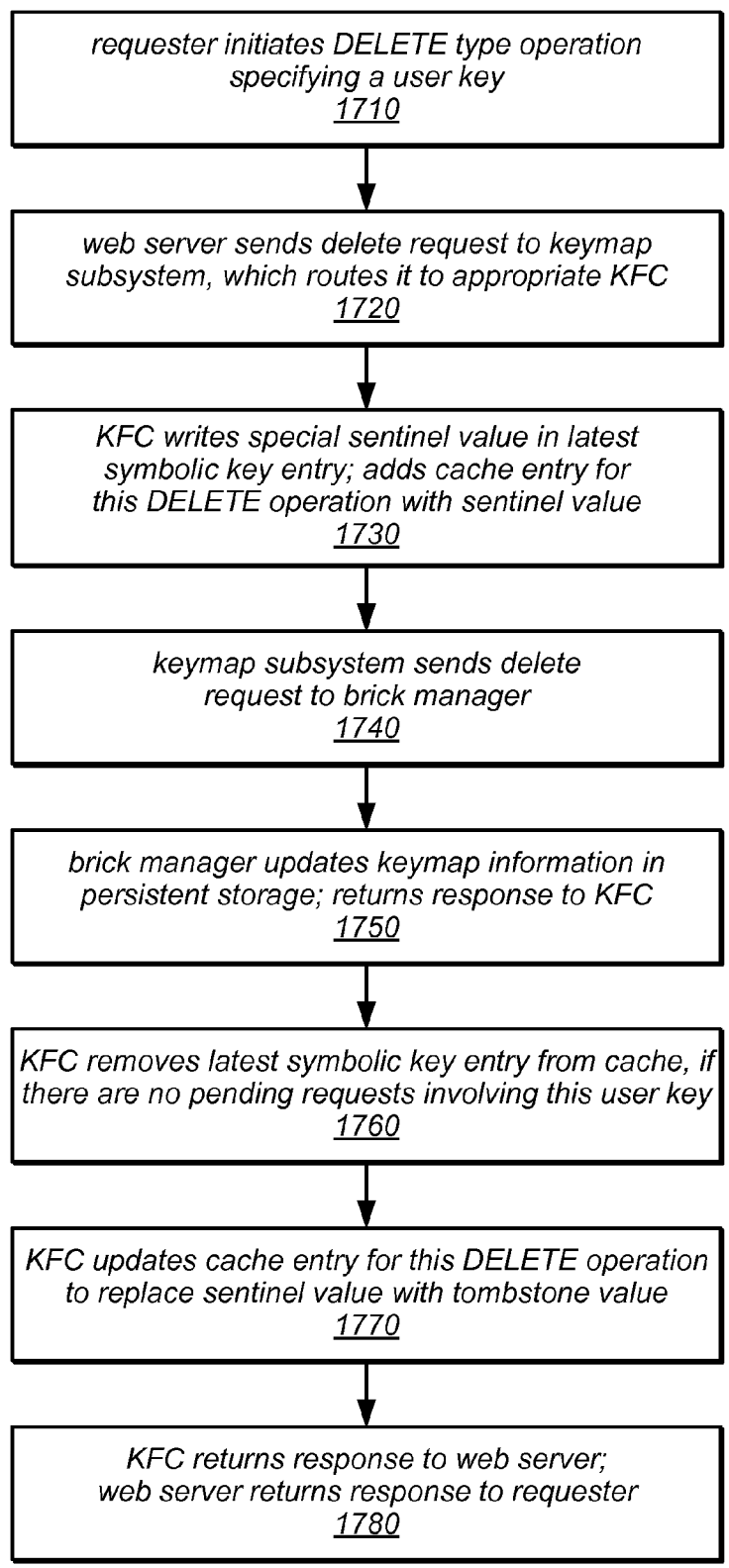
FIG. 17 is a flow diagram illustrating a method for updating keymap information following a DELETE operation in a distributed storage system, according to some embodiments.

As illustrated at 1740 in FIG. 17, the KFC may forward the delete request to an appropriate brick manager to update the keymap information for the object instance that is the target of the DELETE operation specified in the request, as in 1750. In some embodiments, updating the keymap information for the targeted object may include the brick manager deleting the keymap information for the targeted data object instance from persistent storage. In other embodiments, e.g., embodiments in which delete markers are stored in the place of deleted object instances for a given user key rather than actually deleting those object instances, the brick manager may not delete the keymap information for the targeted data object instance for the given user key, whether or not the data object instance is itself deleted. In either case, the brick manager may return a response to the KFC indicating that the DELETE operation has been performed.

As illustrated at 1760 in this example, once the DELETE operation has been performed, the method may include the KFC removing the latest symbolic key entry for this user key (if there are no pending requests involving this user key). The KFC may also update the cache entry for this DELETE operation to replace the sentinel value with a special tombstone value, as in 1770. This special tombstone value in the cache entry may indicate that a DELETE operation has been performed on a data object (e.g., a particular data object instance) with the specified user key. The KFC may return a response to the web services interface indicating that the DELETE operation has been performed, and the web services interface may in turn return a similar response to the requester, as in 1780.

In some embodiments, rather than continuing to add entries to a cache in a keymap subsystem (e.g., latest symbolic key entries) without explicitly replacing cache entries that are no longer needed, a storage system may include mechanisms for removing extraneous entries from the cache. One embodiment of a method for removing cache entries that are no longer needed in a keymap subsystem is illustrated by the flow diagram in FIG. 18. As illustrated in this example, the method may include a keymap coordinator (KFC) receiving a request from a web services interface (WS) to store keymap information for a data object instance being PUT, as in 1810, and the request may specify a user key. For example, a request to PUT a data object instance may be received by the web services interface from a user or requesting application, in different embodiments. As illustrated at 1820 in this example, the KFC may create or update a latest symbolic key entry for the specified user key, and may write a special sentinel value in this cache entry. The method may also include the KFC adding (or updating) a cache entry for this request and setting the value in this cache entry to a special sentinel value (e.g., the same sentinel value or a different sentinel value, in various embodiments).

Figure 18:
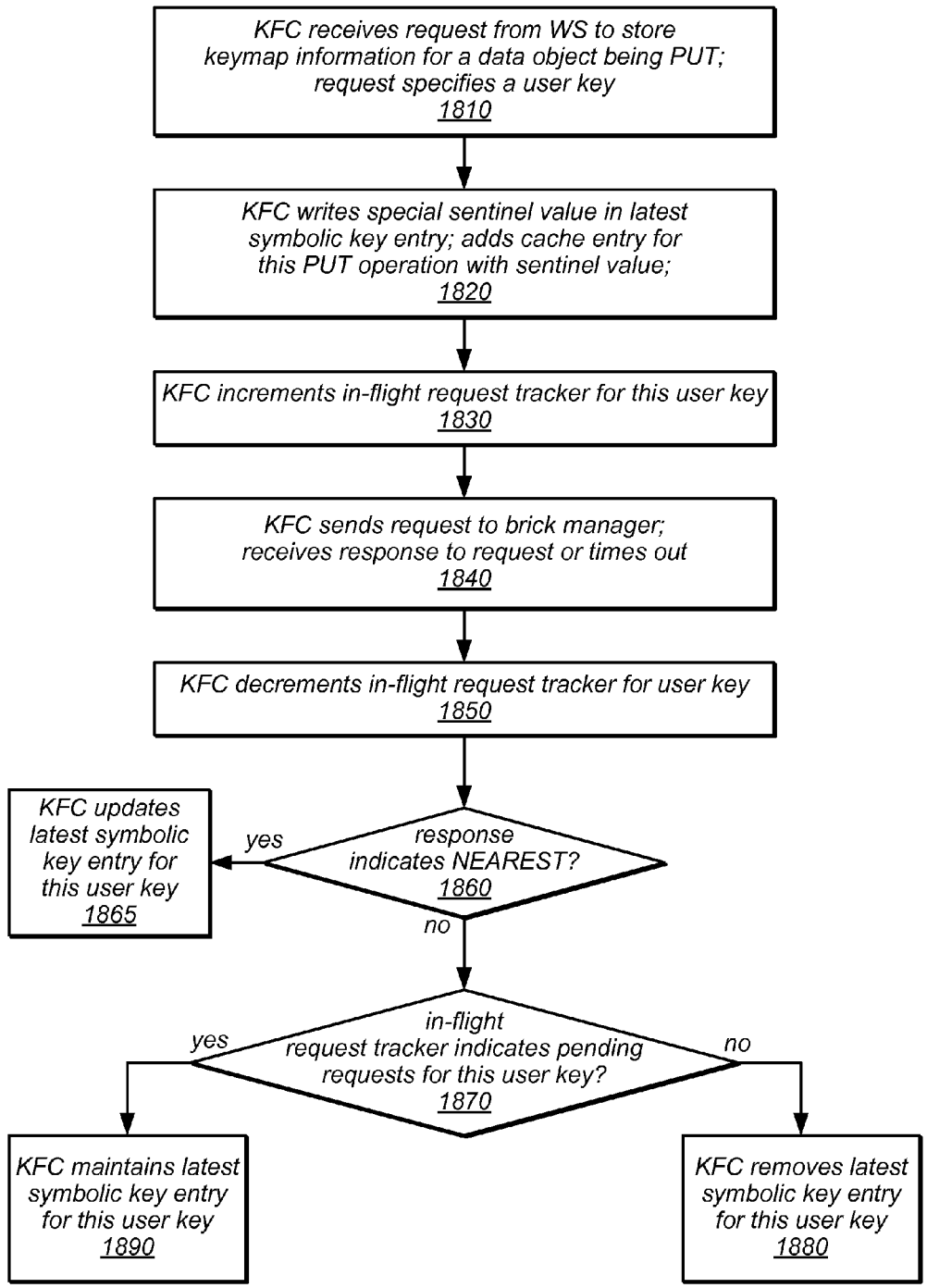
FIG. 18 is a flow diagram illustrating a method for removing cache entries that are no longer needed in a keymap subsystem, according to some embodiments.

As illustrated in this example, the method may include the KFC incrementing an in-flight request tracker for the specified user key, as in 1830. The KFC may send the request to a brick manager (which may store the keymap information for this PUT operation), as in 1840. As illustrated in FIG. 18, the KFC may receive a response to the request from the brick manager indicating that the keymap information has been stored (and, in some cases, indicating whether the data object instance is the latest version of the data object), or the request may time out without the brick manager sending a response to the KFC. After receiving a response (or after a pre-determined timeout period has expired), the method may include the KFC decrementing the in-flight request tracker for this user key, as in 1850. If the response from the brick manager indicates that the object being PUT is the latest version of the objects with the specified user key, e.g., if the is-nearest parameter value is NEAREST (shown as the positive exit from 1860), the method may include the KFC updating the latest symbolic key entry for this user key, i.e. replacing the sentinel value that was mapped to the latest symbolic key with the version-id of the newly PUT object, as in 1865.

As illustrated in this example, if the response from the brick manager does not indicate that the object being PUT is the latest version of the objects with the specified user key, e.g., if the is-nearest parameter value is NOTNEAREST or UNKNOWN (shown as the negative exit from 1860), the KFC may query or examine the in-flight request tracker to determine whether there are any pending requests for this user key. If the in-flight request tracker indicates that there are still pending requests (e.g., pending requests to store or retrieve keymap information) for this user key (shown as the positive exit from 1870), the method may include the KFC maintaining the latest symbolic key entry for this user key (i.e. maintaining the sentinel value in the cache entry for the latest symbolic key) in its cache, as in 1890. If the in-flight request tracker indicates that there are no pending requests for this user key (shown as the negative exit from 1870), the method may include the KFC removing the latest symbolic key entry for this user key (i.e. the cache entry for the latest symbolic key containing the special sentinel value), as in 1880. Note that in some embodiments, the latest symbolic key entry may not be removed (e.g., at 1880) if another operation has already caused the sentinel value to be replaced with the version-id of another data object instance. In still other embodiments, the value of the latest symbolic key entry may not be maintained (e.g., at 1890) if another operation has already caused the sentinel value to be replaced with the version-id of another data object instance (e.g., it may instead be removed).

As described above, in some embodiments, keymap information for stored data objects may be cached as key-value pairs in a distributed hash table, e.g, a distributed hash table in a keymap subsystem of a distributed storage system. A distributed hash table is a hash table spread across many computing nodes (i.e. machines) within a fleet of computing nodes. Each participant machine in the hash table may hold a subset of the data stored in the hash table. One potentially difficult task when using a distributed hash table is finding a computing node in the fleet that contains the data a requester (e.g., a user or requesting application) is looking for.

In consistent hashing, a hash function is executed in order to identify the machine within the fleet that should house the data associated with a key (e.g., a user key or a composite key). This hash function is sometimes referred to as the routing algorithm. In general, a hash function maps a key-value pair in the key domain to a numerical index in another domain. For example, a routing algorithm may apply a hash function to the key of a key-value pair in order to transform the key from its native domain type into the domain space of possible cache nodes within the distributed fleet. Once the transformation is applied, the caller has identified a machine that could contain the key within the fleet.

Given a good hash function and key space, consistent hashing may produce a good distribution of keys across the fleet of machines. However, keys which as "close" to one another within their own domain spaces may not end up on the same machine in the fleet or even close to each other within the distributed system. The result may be that keys that need to be close to one another to support operations efficiently (such as a "GETNEAREST" operation in a keymap subsystem) may not be close to one another.

In some embodiments, the systems described herein extend the routing algorithm described above so that a key may be bisected into two parts: a part of the key to which the hash function is applied in the routing algorithm, and another part of the key to which the hash function is not applied (and which does not affect the operation or results of the routing algorithm). In some embodiments, for example, when two or more keys differ only in the latter part, they may both be stored on the same machine. As described herein, this mechanism may in some embodiments be employed in a storage system that supports versioning, and may allow the storage system to leverage "user key" locality when executing various APIs, e.g., GETNEAREST.

Figure 19:
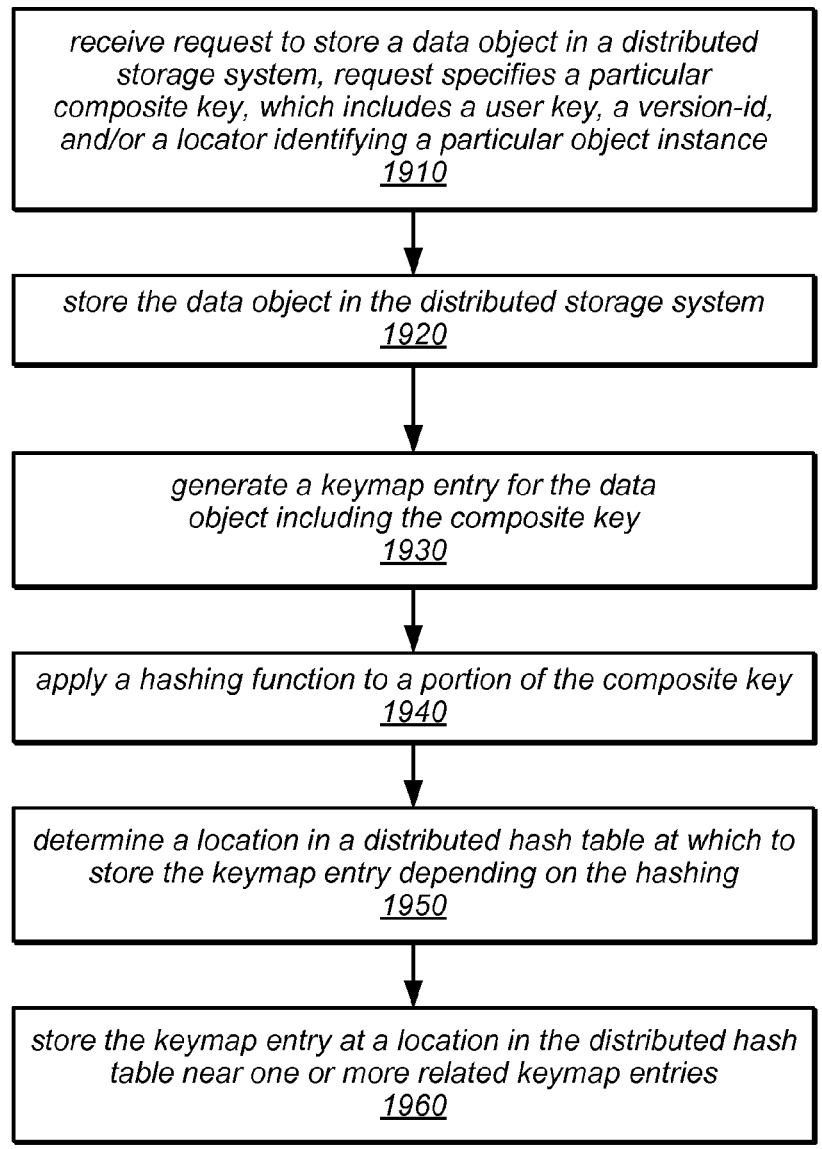
FIG. 19 is a flow diagram illustrating a method for clustering keys in a distributed storage system, according to some embodiments.

One embodiment of a method for clustering keys in a distributed storage system is illustrated by the flow diagram in FIG. 19. As illustrated in 1910, the method may include the storage system receiving a request to store a data object in the distributed storage system, and the request may specify a particular composite key, which may include a sharable user key, a version-id, and/or a locator identifying a particular object instance. As illustrated in this example, the method may include storing the data object in the distributed storage system, as in 1920, and generating a keymap entry for the data object, as in 1930. In various embodiments, the keymap entry may include the entire composite key, and/or any of the user key, a version-id (which may include a sequencer or other timestamp), and/or an object instance locator identifying a particular instance or copy of a data object having the specified user key. Note that some of this information (e.g., a user key portion of a composite key) may be specified by a user (e.g., a storage service subscriber) or a requesting application, while other information may be generated by the web services interface or another component of the storage system in response to receiving a user request.

The method may include applying a hash function only to a portion of the composite key (i.e. to less than all of the bits of the key), as in 1940. For example, in some embodiments, the composite key may include multiple fields or encodings, and the hash function may be applied to or exclude one or more of the fields or encodings of the composite key. In some embodiments, the hash function may be applied to or exclude a pre-determined number of bits of the composite key. In various embodiments, the hash function may be applied to or exclude the same portions, fields, encodings, or bits for all composite keys or may be applied to or exclude different portions, fields, encodings, or bits for different composite keys. In one embodiment, a version-id delimiter of a composite key (as described above) may be used to identify the portion of the key to which the hash function should be applied. In this example, only the user key portion of the composite key and not the version-id (or sequencer or ID portion thereof) may be used by the hash router to determine the location at which the keymap information should be stored, thus clustering keymap information for data object instances having the same user key on a single computing node and/or in a cache thereof. Applying a hash function to other portions, partitions or subsets of other types of composite keys or user keys (including less than all of the bits of a user key) may facilitate the clustering of related user keys, of keys stored in same a time range, or keys having any other common (or similar) element, in various embodiments.

As illustrated in this example, the method may include determining a location in a distributed hash table at which to store the keymap entry dependent on the results of the hashing, as in 1950. For example, different ranges of hash values may be mapped to a respective one of a plurality of keymap coordinators. In various embodiments, each keymap coordinator may cache the keymap information for subsequent use. As illustrated in this example, and described above, by determining a location in the distributed hash table at which to store the keymap entry using a hash value for a portion of the key (rather than the entire key), the keymap entry may be stored at a location in the distributed hash table near one or more related keymap entries, as in 1960.

Figure 20:
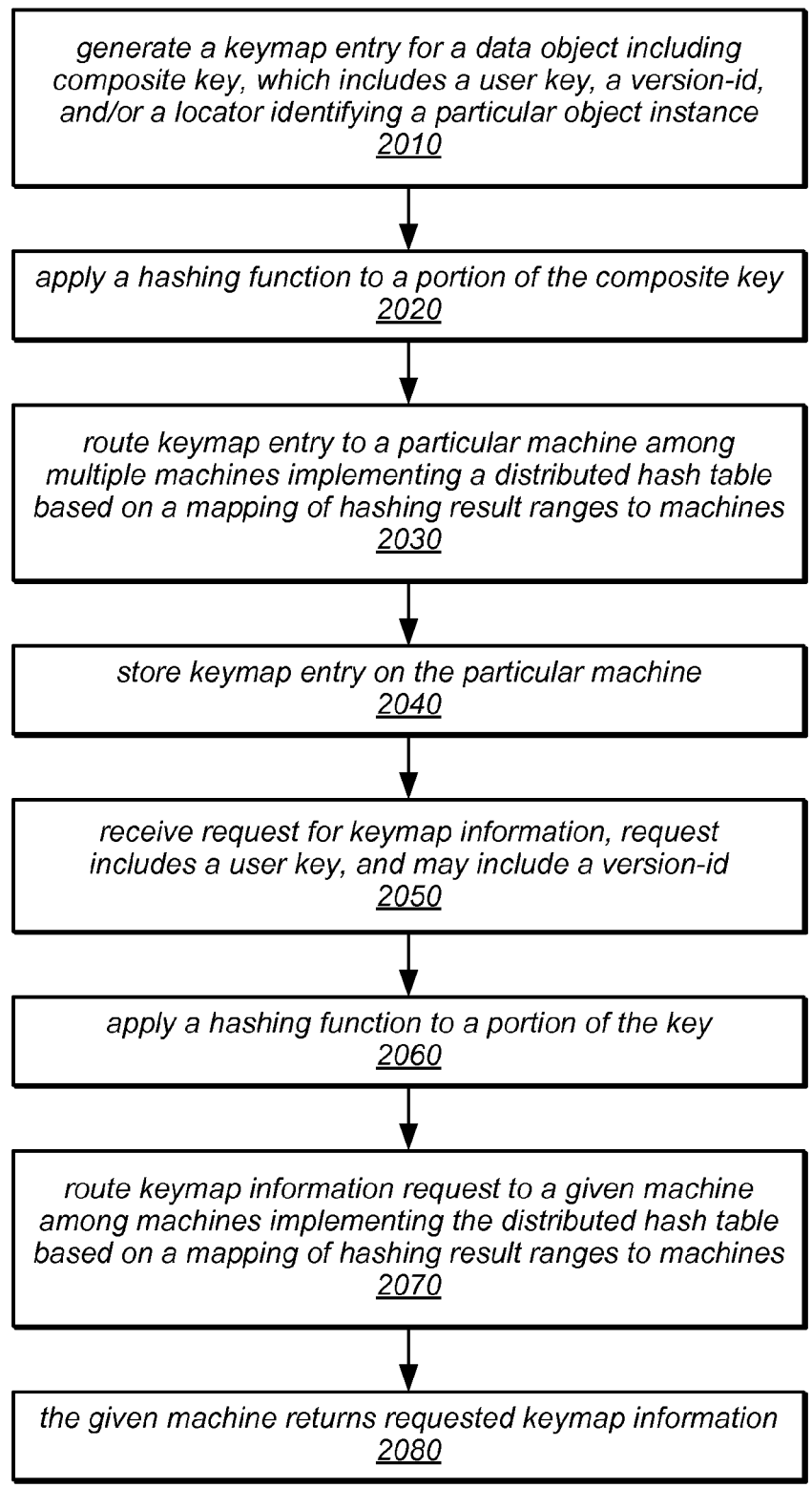
FIG. 20 is a flow diagram illustrating a method for routing access requests for keymap information in a distributed storage system, according to some embodiments.

One embodiment of a method for routing access requests for keymap information in a distributed storage system (e.g., requests to read or write keymap entries) is illustrated by the flow diagram in FIG. 20. As illustrated in this example, the method may include generating a keymap entry for a data object stored in a distributed storage system that includes a composite key, and the composite key may include a sharable user key, a version-id, and/or a locator identifying a particular object instance, as in 2010. Note that some of this information (e.g., a user key portion of a composite key) may be specified by a user (e.g., a storage service subscriber) or a requesting application, while other information may be generated by the web services interface or another component of the storage system in response to receiving a user request. As illustrated in FIG. 20 and described above, in some embodiments, the method may include applying a hash function to a portion of the composite key, as in 2020, and routing the keymap entry to a particular machine among multiple machines implementing a distributed hash table based on a mapping of hash value ranges to machines, as in 2030. The keymap entry may be stored on the particular machine mapped to the range of hash values that includes the hash value generated from a portion of the composite key, as in 2040, e.g., in a KFC cache on the particular machine.

As illustrated at 2050 in FIG. 20, the storage system may receive a request for keymap information for a data object (e.g., from a user or application) including at least a portion of a composite key, e.g., a user key, and (in some cases) a version-id (e.g., a request for the recently cached keymap information or for keymap information for another data object instance). If the request does not specify a version-id the storage system may determine the latest version of the data object having the user key included in the request, as described herein. As illustrated in this example, a method for routing requests to access (read) keymap information may include applying a hash function to a portion of the composite key (or elements thereof) included in the request, as in 2060, and routing the keymap information request to a given machine among machines implementing the distributed hash table based on a mapping of hash value ranges to machines, as in 2070. For example, the keymap information request may be routed to a machine that is mapped to the range of hash values that includes the hash value generated from a portion of the composite key (or elements thereof) included in the request. The given machine may then return the requested keymap information to the requester (e.g., the user or requesting application), as in 2080. Note that the operations illustrated in FIG. 20 may be repeated for any number of requests for keymap information, e.g., for GET type operations, or GETNEAREST type operations.

Figure 21:
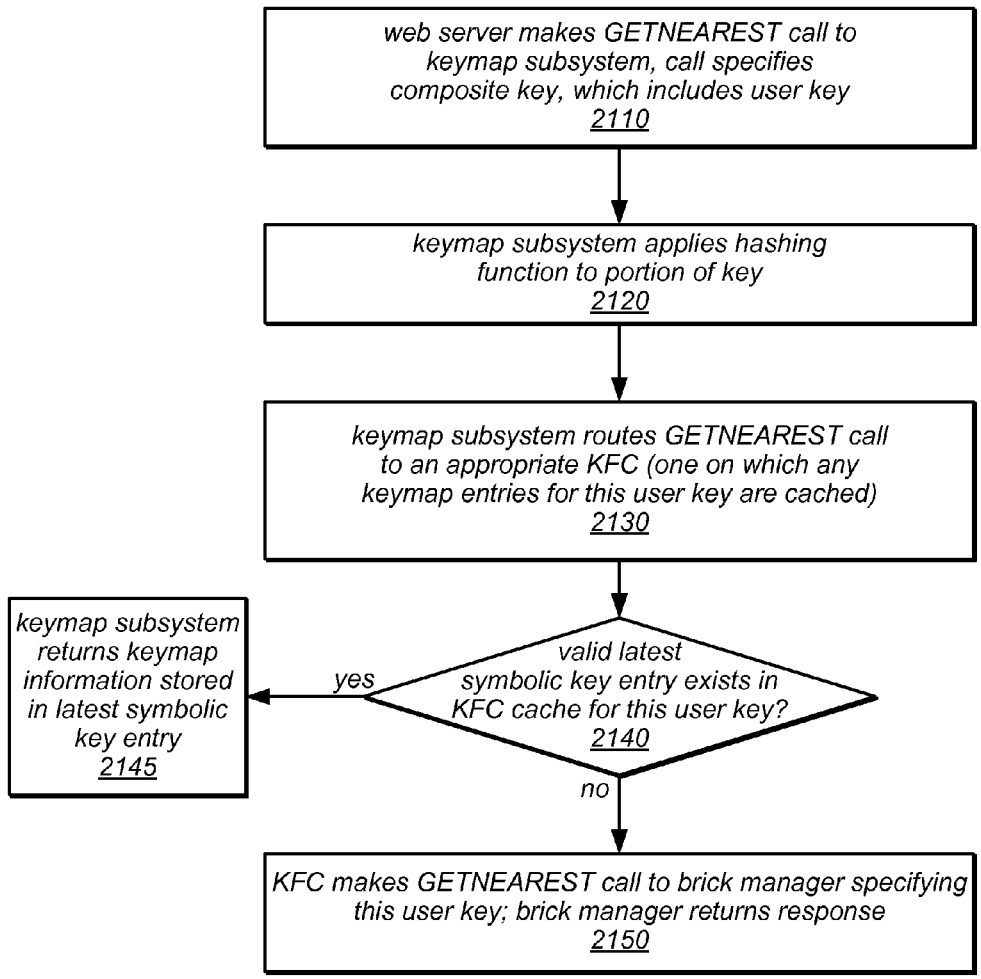
FIG. 21 is a flow diagram illustrating a method for determining the latest version of an object in a distributed storage system, according to some embodiments.

One embodiment of a method for determining the latest version of an object in a distributed storage system in which keymap information is stored on particular machines based on a consistent hashing of a portion of a key is illustrated by the flow diagram in FIG. 21. As illustrated in this example, the method may include a web server making a GETNEAREST call to a keymap subsystem, as in 2110, and the call may specify a composite key (which may include at least a user key). As described above, in some embodiments the keymap subsystem may apply a hash function to a portion of the composite key, as 2120, and the keymap subsystem may route the GETNEAREST call to an appropriate keymap coordinator (KFC), as in 2130. For example, a hash routing component of the keymap subsystem may route the call to a machine mapped to a range of hash values that includes the hash value generated from a portion of the specified composite key, and this machine may also cache keymap entries for other data object instances having the same user key as that included in the request.

As illustrated in this example, if a valid latest symbolic key entry for this user key exists in the KFC's cache, shown as the positive exit from 2140, the keymap subsystem may return the keymap information stored in latest symbolic key entry, as in 2145. If there is no valid latest symbolic key entry for this key in the KFC's cache (e.g., if no such entry exists, or if a latest symbolic key entry from this user key includes a special sentinel value rather than a valid version-id value), shown as the negative exit from 2140, the method may include the KFC making a GETNEAREST call to a brick manager specifying this user key, as in 2150, and the brick manager may determine the latest version of the stored objects having the specified user key. The brick manager may then return the keymap information for the latest version of the objects having the specified key (and the version-id of the latest version) to the KFC. Note that the KFC cache may be more likely to include a valid latest symbolic key entry for a given user in embodiments in which all keymap entries for data object instances having the same user key are mapped to the same KFC.

Note that in embodiments in which keymap information is stored on particular computing nodes and/or in particular storage partitions or blocks (bricks) based on a consistent hashing of a portion of a key, the brick manager may only need to access one storage partition or block (brick) on one computing node to examine multiple keymap entries for a key (since this routing mechanism may result in the clustering of keymap entries for a given user key on the same storage partition or block (brick). In some embodiments, the leading keymap entry for the given user key, its neighbor, and/or a latest symbolic key entry for this user key may all be present in the same KFC cache according to this routing mechanism.

As previously noted, various hash value ranges may be mapped to one of the keymap coordinators (KFCs) in a keymap subsystem of a distributed storage system. In some embodiments, each keymap coordinator may be associated with a single hash value range, while in other embodiments, some or all of the keymap coordinators in a keymap subsystem may be associated with multiple ranges of hash values. This multiplicity in mapping may be further illustrated by the block diagram illustrated in FIG. 22. In this example, the set of potential, or known hash values, may be represented as a ring 2200. The hash values represented on ring 2200 may be mapped to one of six keymap coordinators (identified in FIG. 22 by the labels KFC1-KFC6), and the points on ring 2200 that are labeled with these KFC identifiers indicate the last hash value that is mapped to the identified KFC.

Figure 22:
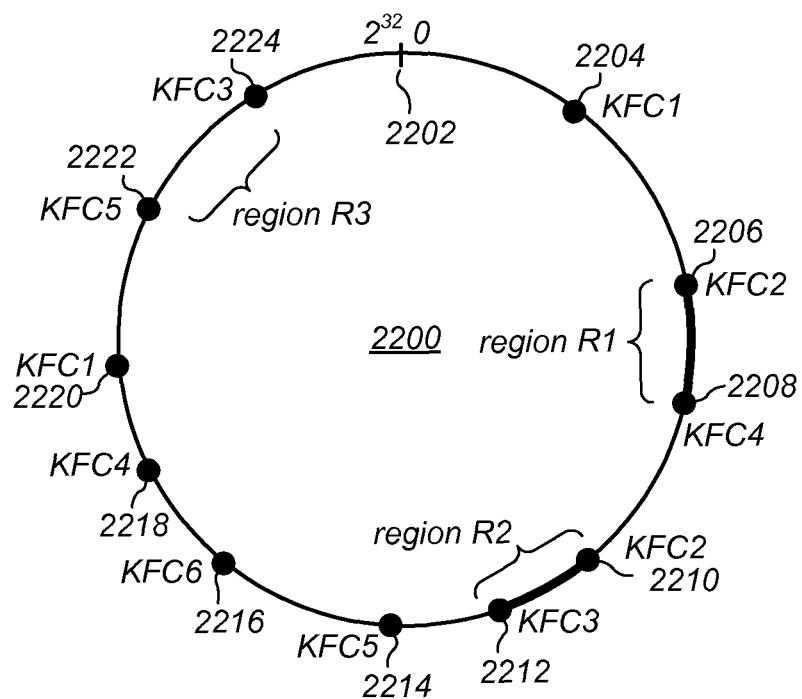
FIG. 22 is a block diagram illustrating multiplicity in a mapping of hash values to keymap coordinators, according to some embodiments.

As illustrated in FIG. 22, ring 2200 of potential hash values may be broken down into a set of hash value ranges. In the example illustrated in FIG. 22, as in the example illustrated in FIGS. 9A and 9B, the hash value ranges defined for each keymap coordinator may be of different lengths. In other embodiments, the hash value ranges defined for each keymap coordinator may be of equal size. In this example, the hash value ranges mapped to various KFCs include the hash value ranges labeled as region R1 (between points 2206 and 2208 of ring 2200) and region R2 (between points 2210 and 2212 of ring 2200), and these hash value ranges are mapped to different KFCs (e.g., KFC4 and KFC3, respectively). In this example, the hash value ranges labeled as region R2 (between points 2210 and 2212 of ring 2200) and region R3 (between points 2222 and 2224 of ring 2200) are mapped to the same KFC (KFC3). Again note that the assignment of ranges with ring 2000 may not necessarily follow a consistent order or pattern. For example, in various embodiments, the order of the assignment of hash value ranges to keymap coordinators may be random, or may be determined in accordance with selection/processing criteria other than, or in addition to, a consistent hashing scheme.

In some embodiments, the system and methods described herein for caching and retrieving keymap information and for routing access requests for keymap information may be employed by a storage service that provides storage for subscribers as part of a virtualized computing service. In various embodiments, virtualized computing may be offered as an on-demand, paid service to clients, and may include a virtualized storage service, which may in some embodiments support object versioning, as described herein. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources.

Example Computer System Embodiment

It is contemplated that in some embodiments, any of the methods, techniques or components described herein may be implemented as instructions and data capable of being stored or conveyed via a computer-accessible medium. Such methods or techniques may include, for example and without limitation, various methods of caching and retrieving keymap information and for routing access requests for keymap information, as described herein. Such instructions may be executed to perform specific computational functions tailored to specific purposes (e.g., processing requests received via a web services interface; storing, retrieving, modifying and/or otherwise accessing data objects and/or access control lists and metadata thereof; maintaining multiple versions of stored data objects; caching and retrieving keymap information; and routing access requests for keymap information, as described herein) as well as higher-order functions such as operating system functionality, virtualization functionality, network communications functionality, application functionality, storage system functionality, and/or any other suitable functions.

Figure 23:
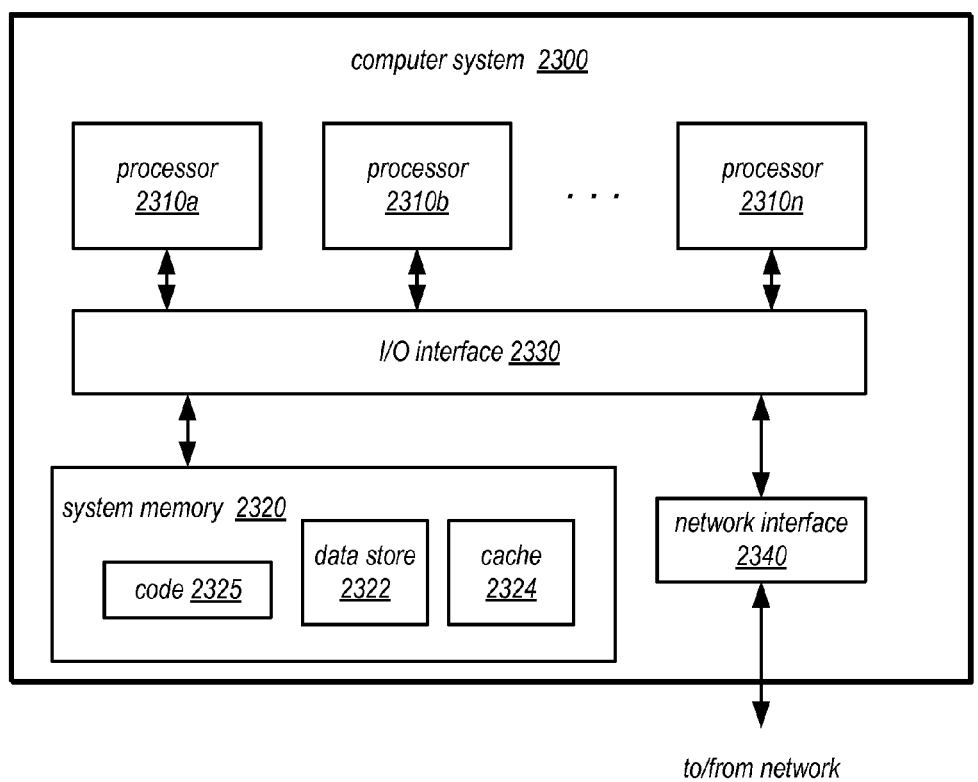
FIG. 23 illustrates one embodiment of a computer system that implements the techniques described herein.

One example embodiment of a computer system that includes computer-accessible media and that supports caching and retrieving keymap information and routing access requests for keymap information using the mechanisms described herein is illustrated in FIG. 23. In various embodiments, the functionality of any of the various modules or methods described herein may be implemented by one or several instances of computer system 2300. In particular, it is noted that different elements of the system described herein may be implemented by different computer systems 2300. For example, a storage system that supports the functionality described herein for caching and retrieving keymap information and for routing keymap information requests may be implemented on the same computer system 2300 on which a client (through which a user/requester accesses the storage system) executes, or on another computer system 2300, in different embodiments. In another example, data objects may be stored on one or more of a plurality of computing nodes in a distributed storage system, a keymap subsystem may be implemented on one or more of the computing nodes, and keymap information may stored in a distributed hash table across multiple ones of the computing nodes, and each of the computing nodes may be similar to computer system 2300.

In the illustrated embodiment, computer system 2300 includes one or more processors 2310 coupled to a system memory 2320 via an input/output (I/O) interface 2330. Computer system 2300 further includes a network interface 2340 coupled to I/O interface 2330. In various embodiments, computer system 2300 may be a uniprocessor system including one processor 2310, or a multiprocessor system including several processors 2310 (e.g., two, four, eight, or another suitable number). Processors 2310 may be any suitable processor capable of executing instructions. For example, in various embodiments processors 2310 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 2310 may commonly, but not necessarily, implement the same ISA.

System memory 2320 may be configured to store instructions (e.g., code 2325) and data (e.g., in data store 2322) accessible by processor 2310. In various embodiments, system memory 2320 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting versioning of stored data objects, for performing various operations to store, retrieve, modify and otherwise access data objects and/or access control lists thereof on a storage system, for caching keymap information, and for routing access requests for keymap information in the storage system according to the APIs and other mechanisms described herein), are shown stored within system memory 2320 as code 2325. It is noted that in some embodiments, code 2325 may include instructions and data implementing desired functions that are not directly executable by processor 2310 but are represented or encoded in an abstract form that is translatable to instructions that are directly executable by processor 2310. For example, code 2325 may include instructions specified in an ISA that may be emulated by processor 2310, or by other code 2325 executable on processor 2310. Alternatively, code 2325 may include instructions, procedures or statements implemented in an abstract programming language that may be compiled or interpreted in the course of execution. As non-limiting examples, code 2325 may include code specified in a procedural or object-oriented programming language such as C or C++, a scripting language such as perl, a markup language such as HTML or XML, or any other suitable language.

In some embodiments, objects (e.g., data objects and/or delete marker objects in one or more buckets) and/or access control lists and other metadata thereof may be stored in a data store 2322 within system memory 2320. In some embodiments, data store 2322 may store one or more tables indicating the mapping of hash value ranges to computing nodes or partitions of a distributed hash table. In some embodiments, system memory 2320 may include persistent storage in which data objects and/or keymap information are stored in the distributed storage system. In some embodiments, computer system 2300 may be a computer system on which a keymap subsystem of a distributed storage system is implemented, and system memory 2320 may include one or more caches 2324, such as the caches associated with each keymap coordinator (KFC) in the keymap subsystem.

In one embodiment, I/O interface 2330 may be configured to coordinate I/O traffic between processor 2310, system memory 2320, and any peripheral devices in the device, including network interface 2340 or other peripheral interfaces. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments some or all of the functionality of I/O interface 2330, such as an interface to system memory 2320, may be incorporated directly into processor 2310.

Network interface 2340 may be configured to allow data to be exchanged between computer system 2300 and other devices attached to a network, such as other computer systems, for example. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 2320 may include a non-transitory, computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 2300 via I/O interface 2330. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 2300 as system memory 2320 or another type of memory. A computer-accessible storage medium may generally be accessible via transmission media or signals such as electrical, electromagnetic, or digital signals, conveyed via a communication medium such as a network and/or a wireless link, such as may be implemented via network interface 2340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
performing, by a computer system that stores a plurality of data objects in a distributed storage system:
storing an instance of a data object, wherein storing the instance of the data object comprises:
receiving, from an entity other than the distributed storage system, a request to store the instance of the data object in the distributed storage system, wherein the request comprises a user key for the data object and a version identifier for the instance of the data object;
generating keymap information for the instance of the data object that maps the user key to a locator and the locator to the instance of the data object;
caching the keymap information at a keymap coordinator in the distributed storage system;
caching a latest symbolic key entry at the keymap coordinator, wherein the latest symbolic key entry comprises the version identifier for the instance of the data object and indicates that the instance of the data object is the latest version of the data object stored in the distributed storage system;

providing, responsive to a request to retrieve the latest version of the data object, the latest version of the data object, wherein the request does not specify the version of the data object to be obtained, wherein providing the latest version of the data object comprises:

receiving, from an entity other than the distributed storage system, the request to retrieve the latest version of the data object, wherein the request comprises the user key for the data object but does not include a version identifier of the latest version of the data object;

determining the version identifier of the latest version of the data object dependent on the cached latest symbolic key entry; and returning, based on the determined version identifier, the latest version of the data object having the user key.

2. The method of claim 1, wherein said determining the version identifier of the latest version of the data object comprises obtaining the version identifier from the latest symbolic key entry cached at the keymap coordinator.

3. The method of claim 1, further comprising:

prior to said caching the latest symbolic key entry at the keymap coordinator, determining that the instance of the data object is the latest version of the data object stored in the distributed storage system.

4. The method of claim 3, further comprising:

setting a flag to indicate that the latest symbolic key entry should be updated;

wherein said determining that the instance of the data object is the latest version of the data object is performed in response to the flag being set.

5. The method of claim 1, further comprising, prior to said receiving a request to retrieve the latest version of the data object:

receiving a request to store another instance of the data object in the distributed storage system, wherein the request comprises the user key for the data object and a version identifier for the other instance of the data object;

generating keymap information for the other instance of the data object;

caching the keymap information for the other instance of the data object at the keymap coordinator; and updating the cached latest symbolic key entry at the keymap coordinator, wherein the updated latest symbolic key entry comprises the version identifier for the other instance of the data object and indicates that the other instance of the data object is the latest version of the data object stored in the distributed storage system;

wherein said determining the version identifier of the latest version of the data object comprises obtaining the version identifier from the updated latest symbolic key entry cached at the keymap coordinator.

6. A method, comprising:

performing, by a computer system that stores a plurality of data objects in a distributed storage system:

caching keymap entries for one or more data object instances stored in the distributed storage system, wherein each keymap entry maps a user key to a locator and the locator to an instance of a data object having the user key, wherein multiple versions of the instance of the data object have the same user key;

caching a latest symbolic key entry for at least one of the user keys, wherein each latest symbolic key entry includes a version identifier for the latest version of the data objects stored in the distributed storage system having a particular user key;

receiving a request to retrieve the latest version of a data object, wherein the request specifies a user key for the data object but does not include a version identifier of the latest version of the data object;

determining the version identifier of the latest version of the data object dependent on whether a latest symbolic key entry for the specified user key is cached in the distributed storage system; and returning keymap information for the latest version of the data object.

7. The method of claim 6, wherein a latest symbolic key entry for the specified user key is cached in the distributed storage system; and wherein said determining the version identifier of the latest version of the data object comprises obtaining the version identifier from the latest symbolic key entry.

8. The method of claim 6, further comprising storing the keymap entries for one or more data object instances in persistent storage in the distributed storage system.

9. The method of claim 6, wherein no latest symbolic key entry for the specified user key is cached in the distributed storage system; and wherein said determining the version identifier of the latest version of the data object comprises examining two or more keymap entries stored in persistent storage in the distributed storage system.

10. The method of claim 6, further comprising:

receiving a request to store keymap information for an instance of a data object having a new user key;

storing the keymap information for the instance of the data object having the new user key in persistent storage in the distributed storage system; and creating a latest symbolic key entry for the new user key, wherein the latest symbolic key entry for the new user key comprises a version identifier for the instance of the data object having the new user key and indicates that the instance of the data object having the new user key is the latest version of the data object having the new user key stored in the distributed storage system.

11. The method of claim 6, receiving a request to store keymap information for an instance of a data object having an existing user key;

determining whether it is possible that the instance of the data object having the existing user key is the latest version of the data objects stored in the distributed storage system having the existing user key; and in response to determining that it is possible that the instance of the data object having the existing user key is the latest version of the data objects stored in the distributed storage system having the existing user key, setting a flag to indicate that a calculation of the latest version of the data objects stored in the distributed storage system having the existing user key should be attempted.

12. The method of claim 11, wherein attempting to calculate the latest version of the data objects stored in the distributed storage system having the existing user key comprises:

storing a special sentinel value in a latest symbolic key entry for the existing user key;

examining one or more keymap entries stored in persistent storage; and returning a response to the attempt.

13. The method of claim 12,
wherein the response includes an indication that the instance of the data object having the existing user key is the latest version of the data objects stored in the distributed storage system having the existing user key; and
wherein the method further comprises:
replacing the special sentinel value stored in the latest symbolic key entry for the existing user key with a value indicating the version identifier of the instance of the data object having the existing user key.

14. The method of claim 12,
wherein the response includes an indication that the instance of the data object having the existing user key is not the latest version of the data objects stored in the distributed storage system having the existing user key or that it is unknown whether the instance of the data object having the existing user key is the latest version of the data objects stored in the distributed storage system having the existing user key; and
wherein the method further comprises:
removing the latest symbolic key entry for the existing user key from the cache.

15. The method of claim 14, wherein said removing the latest symbolic key entry for the existing user key from the cache is performed in response to determining that there are no pending requests to access keymap information for data objects having the existing user key.

16. The method of claim 11, further comprising
prior to determining that it is possible that the instance of the data object having the existing user key is the latest version of the data objects stored in the distributed storage system having the existing user key, creating a cache entry for the instance of the data object having the existing user key, and storing a special sentinel value in the cache entry; and
in response to determining that the instance of the data object having the existing user key is the latest version of the data objects stored in the distributed storage system having the existing user key, replacing the special sentinel value stored in the cache entry for the instance of the data object with keymap information for the instance of the data object.

17. The method of claim 6, wherein said caching keymap entries comprises storing the keymap entries on two or more computing nodes of the computer system in a distributed hash table, and wherein each keymap entry is indexed in the distributed hash table by hash value generated from at least a portion of a composite key that includes the user key and that uniquely identifies a data object instance stored in the distributed storage system.

18. The method of claim 17, wherein keymap entries for two or more data object instances having the same user key are stored on the same computing node in the distributed hash table.

19. A non-transitory, computer-readable storage medium storing program instructions that when executed on one or more computers cause the one or more computers to perform:
caching keymap entries for one or more data object instances stored in a distributed storage system, wherein each keymap entry maps a user key to a locator and the locator to an instance of a data object having the user key, wherein multiple versions of the instance of the data object have the same user key;
caching a latest symbolic key entry for at least one of the user keys, wherein each latest symbolic key entry includes a version identifier for the latest version of the data objects stored in the distributed storage system having a particular user key;
receiving a request to retrieve the latest version of a data object, wherein the request specifies a user key for the data object but does not include a version identifier of the latest version of the data object;
determining the version identifier of the latest version of the data object dependent on whether a latest symbolic key entry for the specified user key is cached in the distributed storage system; and
returning keymap information for the latest version of the data object.

20. The storage medium of claim 19,
wherein a latest symbolic key entry for the specified user key is cached in the distributed storage system; and
wherein said determining the version identifier of the latest version of the data object comprises obtaining the version identifier from the latest symbolic key entry.

21. The storage medium of claim 19,
wherein when executed on the one or more computers, the program instructions further cause the one or more computers to perform storing the keymap entries for one or more data object instances in persistent storage in the distributed storage system;
wherein no latest symbolic key entry for the specified user key is cached in the distributed storage system; and
wherein said determining the version identifier of the latest version of the data object comprises examining two or more keymap entries stored in persistent storage in the distributed storage system.

22. The storage medium of claim 19, wherein when executed on the one or more computers, the program instructions further cause the one or more computers to perform:
receiving a request to store keymap information for an instance of a data object having a new user key;
storing the keymap information for the instance of the data object having the new user key in persistent storage in the distributed storage system; and
creating a latest symbolic key entry for the new user key, wherein the latest symbolic key entry for the new user key comprises a version identifier for the instance of the data object having the new user key and indicates that the instance of the data object having the new user key is the latest version of the data object having the new user key stored in the distributed storage system.

23. The storage medium of claim 19, wherein when executed on the one or more computers, the program instructions further cause the one or more computers to perform:
receiving a request to store keymap information for an instance of a data object having an existing user key;
determining whether it is possible that the instance of the data object having the existing user key is the latest version of the data objects stored in the distributed storage system having the existing user key; and
in response to determining that it is possible that the instance of the data object having the existing user key is the latest version of the data objects stored in the distributed storage system having the existing user key, setting a flag to indicate that a calculation of the latest version of the data objects stored in the distributed storage system having the existing user key should be attempted.

24. The storage medium of claim 23,
wherein attempting to calculate the latest version of the data objects stored in the distributed storage system having the existing user key comprises:
storing a special sentinel value in a latest symbolic key entry for the existing user key;

examining one or more keymap entries stored in persistent storage; and returning a response to the attempt.

25. The storage medium of claim 24, wherein the response includes an indication that the instance of the data object having the existing user key is the latest version of the data objects stored in the distributed storage system having the existing user key; and wherein when executed on the one or more computers, the program instructions further cause the one or more computers to perform:

replacing the special sentinel value stored in the latest symbolic key entry for the existing user key with a value indicating the version identifier of the instance of the data object having the existing user key.

26. The storage medium of claim 24, wherein the response includes an indication that the instance of the data object having the existing user key is not the latest version of the data objects stored in the distributed storage system having the existing user key or that it is unknown whether the instance of the data object having the existing user key is the latest version of the data objects stored in the distributed storage system having the existing user key; and wherein when executed on the one or more computers, the program instructions further cause the one or more computers to perform:

removing the latest symbolic key entry for the existing user key from the cache.

27. The storage medium of claim 26, wherein said removing the latest symbolic key entry for the existing user key from the cache is performed in response to determining that there are no pending requests to access keymap information for data objects having the existing user key.

28. The storage medium of claim 23, wherein when executed on the one or more computers, the program instructions further cause the one or more computers to perform:

prior to determining that it is possible that the instance of the data object having the existing user key is the latest version of the data objects stored in the distributed storage system having the existing user key, creating a cache entry for the instance of the data object having the existing user key, and storing a special sentinel value in the cache entry; and in response to determining that the instance of the data object having the existing user key is the latest version of the data objects stored in the distributed storage system having the existing user key, replacing the special sentinel value stored in the cache entry for the instance of the data object with keymap information for the instance of the data object.

29. A system, comprising:

a persistent data store that stores a plurality of data objects, wherein each of the plurality of data objects comprises a user key and a version identifier;

a cache;

one or more processors; and a memory coupled to the one or more processors and storing program instructions that when executed by the one or more processors cause the one or more processors to perform:

receiving a request to store keymap information for an instance of a data object to be stored in the persistent data store, wherein the request comprises a user key for the data object and a version identifier for the instance of the data object, and wherein the keymap information maps the user key to a locator and the locator to the instance of the data object, wherein multiple versions of the instance of the data object have the same user key;

storing the keymap information in an entry in the cache for the instance of the data object;

storing a latest symbolic key entry in the cache, wherein the latest symbolic key entry comprises the version identifier for the instance of the data object and indicates that the instance of the data object is the latest version of the data object stored in the distributed storage system;

receiving a request to retrieve the latest version of the data object, wherein the request comprises the user key for the data object but does not include a version identifier of the latest version of the data object;

determining the version identifier of the latest version of the data object dependent on the cached latest symbolic key entry; and returning keymap information for the latest version of the data object.

30. The system of claim 29, wherein said determining the version identifier of the latest version of the data object comprises obtaining the version identifier from the latest symbolic key entry stored in the cache.

31. The system of claim 29, wherein when executed by the one or more processors, the program instructions further cause the one or more processors to perform:

prior to said caching the latest symbolic key entry at the keymap coordinator, determining that the instance of the data object is the latest version of the data object stored in the distributed storage system.

32. The system of claim 31, wherein when executed by the one or more processors, the program instructions further cause the one or more processors to perform:

setting a flag to indicate that the latest symbolic key entry should be updated;

wherein said determining that the instance of the data object is the latest version of the data object is performed in response to the flag being set.

33. The system of claim 29, wherein when executed by the one or more processors, the program instructions further cause the one or more processors to perform, prior to said receiving a request to retrieve the latest version of the data object:

receiving a request to store keymap information for another instance of the data object to be stored in the persistent data store, wherein the request comprises the user key for the data object and a version identifier for the instance of the data object, and wherein the keymap information maps the user key to a locator and the locator to the instance of the data object;

storing the keymap information for the other instance of the data object in an entry in the cache; and updating the latest symbolic key entry in the cache, wherein the updated latest symbolic key entry comprises the version identifier for the other instance of the data object and indicates that the other instance of the data object is the latest version of the data object stored in the distributed storage system;

wherein said determining the version identifier of the latest version of the data object comprises obtaining the version identifier from the updated latest symbolic key entry stored in the cache.

* * * * *